United States Patent
Abe

(10) Patent No.: US 8,647,200 B2
(45) Date of Patent: Feb. 11, 2014

(54) GAME SYSTEM, GAME PROCESS METHOD, GAME DEVICE, AND STORAGE MEDIUM STORING GAME PROGRAM

(75) Inventor: Goro Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 62 days.

(21) Appl. No.: 13/367,757

(22) Filed: Feb. 7, 2012

(65) Prior Publication Data

US 2012/0302341 A1 Nov. 29, 2012

(30) Foreign Application Priority Data

May 23, 2011 (JP) ................................. 2011-114865

(51) Int. Cl.
*A63F 9/24* (2006.01)
(52) U.S. Cl.
USPC .................................. 463/31; 463/30; 463/34
(58) Field of Classification Search
USPC ............................................................ 463/31
See application file for complete search history.

(56) References Cited

U.S. PATENT DOCUMENTS

| | | | | |
|---|---|---|---|---|
| 6,821,204 B2 * | 11/2004 | Aonuma et al. | ................. | 463/32 |
| 6,923,722 B2 * | 8/2005 | Yamada et al. | ................. | 463/30 |
| 6,966,837 B1 * | 11/2005 | Best | ................................. | 463/33 |
| 7,326,117 B1 * | 2/2008 | Best | ................................. | 463/32 |
| 7,924,293 B2 | 4/2011 | Tanimura | | |
| 2004/0229687 A1 * | 11/2004 | Miyamoto et al. | .............. | 463/30 |
| 2005/0119053 A1 * | 6/2005 | Suzuki et al. | ................... | 463/42 |
| 2011/0190061 A1 * | 8/2011 | Takeda et al. | ................... | 463/39 |

FOREIGN PATENT DOCUMENTS

JP 4215891 11/2008

* cited by examiner

*Primary Examiner* — Tramar Harper

(74) *Attorney, Agent, or Firm* — Nixon & Vanderhye P.C.

(57) ABSTRACT

An example game device performs a game process based on operation data representing an operation performed on a controller. The game device generates a first game image representing a game space as viewed from a first virtual camera which is set in the game space, and displays the first game image on a television. A second virtual camera, different from the first virtual camera, is set in the game space based on operation data for a terminal device. The game device generates a second game image representing the game space as viewed from the second virtual camera, and displays the second game image on the terminal device. In response to an execution of a predetermined operation on the terminal device 7, the game device stores image information regarding the second game image in a predetermined storage device.

29 Claims, 15 Drawing Sheets

GAME SYSTEM, GAME PROCESS METHOD, GAME DEVICE, AND STORAGE MEDIUM STORING GAME PROGRAM

CROSS REFERENCE TO RELATED APPLICATION

The disclosure of Japanese Patent Application No. 2011-114865 filed on May 23, 2011, is incorporated herein by reference.

FIELD

The present specification discloses a game system, a game process method, a game device, and a storage medium storing a game program, with which it is possible to save images of a game space during a game.

BACKGROUND AND SUMMARY

There are conventional techniques allowing a player to save an image of a game space during a game and to see the image after the game, for example. In accordance with user instructions, conventional game devices save status information, which represents positions of game objects and virtual cameras, etc. After playing the game, game images are reproduced based on the status information, and the player and other people can see the game images.

With the conventional techniques, however, the degree of freedom of game images that can be saved is low, and it is difficult to save, and view afterwards, game images of a game space as viewed from a free range of viewing points (or viewing directions).

Therefore, the present specification discloses a game system, a game process method, a game device, and a storage medium storing a game program, with which it is possible to save game images of a game space as viewed from a freer range of viewing points and viewing directions.

(1)

An example game system described in the present specification includes a game device, a first controller device, and a second controller device.

The game device includes an operation data obtaining unit, a game process unit, a first camera setting unit, a first image generation unit, a first image output unit, a second camera setting unit, a second image generation unit, a second image output unit, and an image information storage unit. The operation data obtaining unit obtains first operation data from the first controller device and second operation data from the second controller device. The game process unit performs a predetermined game process based on the first operation data. The first camera setting unit sets a first virtual camera in a virtual game space. The first image generation unit generates a first game image representing the game space as viewed from the first virtual camera. The first image output unit outputs the first game image to a predetermined display device separate from the second controller device. The second camera setting unit sets, based on the second operation data, a second virtual camera which is arranged in the game space and is different from the first virtual camera. The second image generation unit generates a second game image representing the game space as viewed from the second virtual camera. The second image output unit outputs the second game image to the second controller device. The image information storage unit stores image information regarding the second game image in a predetermined storage device in response to an execution of a predetermined operation on the second controller device.

The second controller device includes an image receiving unit and a display unit. The image receiving unit receives the second game image. The display unit displays the second game image.

The "game device" may be any device capable of performing the processes of the various units set forth above. The game device may be a single-purpose information processing device for games, or a general-purpose information processing device such as an ordinary personal computer.

The "first controller device" is a concept encompassing any controller device that can be operated by a player. The "first controller device" may be a portable game device, or the like, or may be the same device as the second controller device, as well as the controller of the embodiment to be described below. Where the "first controller device" includes a display unit, the display unit is used as the "predetermined display device".

The "second controller device" is a concept encompassing a controller device that includes a display unit and can be operated by a player. The "second controller device" may be a portable game device, or the like, as well as the terminal device of the embodiment to be described below.

The "image information" may be any information as long as a terminal image can be generated based on the information. The "image information" may be an image itself (image data) as shown in the configuration (2) below, or may be information such that an image can be generated using the image information and a game program as shown in the configuration (3) below.

With the configuration (1) above, the second virtual camera, which is controlled using the second controller device, is set in the game space of a game that is played using the first controller device. Therefore, a player who is using the second controller device (referred to as the "second player".) can operate the second virtual camera to thereby display, on the display unit of the second controller device, an image of the game space as viewed from a desired viewpoint and viewing direction, and to further save the image by a predetermined operation. Therefore, the second player can capture images in the game space from a freer range of viewpoints and save the game images, without being limited to the viewpoint (or the viewing direction) of the game image displayed on the predetermined display device for a player who is using the first controller device (referred to as the "first player".). Moreover, with the configuration (1) above, since the saved image is displayed on the display unit of the second controller device, the second player can easily check images to be saved on the second controller device at hand, and can therefore more easily perform image-capturing (saving) operations.

(2)

The image information storage unit may store, as the image information, image data of the second game image.

With the configuration (2) above, since image data itself is stored as the image information, it is possible to display an image also on an information processing device that does not have the function of performing game processes.

(3)

The image information storage unit may store, as the image information, information such that the second game image can be generated using the information and a game program used for performing the predetermined game process.

The "information such that the second game image can be generated" may be, for example, game data such as positions and attitudes of various objects included in the second game image and the position and attitude of the virtual camera.

With the configuration (3) above, the amount of data to be stored can be reduced.

(4)

The image information storage unit may store image information regarding a plurality of second game images which together from a motion video in response to an execution of the predetermined operation.

With the configuration (4) above, a motion video of the game image can be stored.

(5)

The game device may further include a second object control unit for controlling a second object which moves in the game space based on the second operation data. Then, the second camera setting unit sets the second virtual camera based on a position of the second object.

With the configuration (5) above, since the second virtual camera moves in accordance with the movement of the second object, the second player can check the movement of the second virtual camera by checking the movement of the second object. Thus, the second player can more easily perform the game image-capturing (saving) operation.

(6)

The second object control unit may control the second object, independently of whether a predetermined object whose action is controlled by the game process and the second object have collided with each other.

The "predetermined object" may be an object whose action is controlled based on the first operation data (e.g., a player character), or an object whose action is automatically controlled by game processes (e.g., an enemy character).

With the configuration (6) above, since the second object has no influence on the game of the first player which proceeds based on the game processes described above, the first player can comfortably play the game without being hindered by the second object. Since the second object can freely move around in the game space without being influenced by the game of the first player, the second player can more easily perform the game image-capturing (saving) operation.

(7)

The second object control unit may control the second object in accordance with whether a predetermined object whose action is controlled by the game process and the second object have collided with each other.

With the configuration (7) above, since the second object is influenced by the predetermined object, it is possible to improve the gameplay of a game in which images are captured by controlling the second object and to provide a game with high playability. Also in the game of the first player which proceeds based on the game processes described above, the player needs to play the game taking into consideration the action of the second object, and it is therefore possible to realize a game with high quality in terms of the strategic aspect and the playability.

(8)

The first image generation unit may generate the first game image without rendering the second object when the second object is included in a viewing field range of the first virtual camera.

With the configuration (8) above, since the second object is not displayed on the predetermined display device, the first player, who plays the game looking at the predetermined display device, can play the game without paying attention to the second object. That is, since the second object has no influence on the display of the game of the first player, the first player can play the game without being hindered by the second object.

(9)

The first image generation unit may generate the first game image which includes an image of the second object when the second object is included in a viewing field range of the first virtual camera.

With the configuration (9) above, since the second object is displayed on the predetermined display device, the first player, who plays the game looking at the predetermined display device, can play the game while paying attention to the second object. Then, the first player can grasp the position of the second virtual camera in the game, and can therefore play the game while taking into consideration the image-capturing operation by the second object by, for example, allowing the second object to capture an image of the player character from a desired angle. Therefore, the first player and the second player can cooperate with each other to capture (save) desired game images, and it is thus possible to provide a game with higher playability. In a case in which the configurations (6) and (9) above are combined together, it is possible to provide a novel game with high playability in which different players can cooperate with each other for capturing game images while the games of the players do not influence each other.

(10)

The second camera setting unit may set the second virtual camera so that the second object is included in a viewing field range of the second virtual camera when an attitude of a screen of the display unit is closer to being horizontal than a predetermined reference. The second camera setting unit may set the second virtual camera so that a viewpoint is at the second object when the attitude of the screen of the display unit is closer to being vertical than the predetermined reference.

With the configuration (10) above, when the attitude of the screen of the second controller device is close to being horizontal, a game image suitable for operations of moving the second object is displayed on the display unit, whereas when the attitude of the screen of the second controller device is close to being vertical, a game image suitable for operations of capturing game images is displayed on the display unit. Then, the second player can hold the screen of the second controller device in a horizontal position when moving the second object (second virtual camera) so that the second player can perform operations without getting the arms tired. As the second player holds the screen of the second controller device in a vertical position when performing an operation of capturing a game image, the second player can operate the second controller device as if it were an actual camera. Therefore, with the configuration (10) above, it is possible to improve the controllability in movement operations and image-capturing operations using the second controller device, and to easily switch between two different types of operations.

(11)

The game process unit may perform a game process for controlling an action of a predetermined first object based on the first operation data. Then, the second image generation unit generates a second game image including an image of the first object when the first object is included in a viewing field range of the second virtual camera.

With the configuration (11) above, the second player can capture a game image including the first object, which is an object controlled by the first player. Even when a game image in so-called "first person" perspective (a game image as viewed from the first object) is displayed on the predetermined display device, it is possible with the configuration (11) above to capture a game image with the first object therein as viewed from a different position.

(12)

The game device may further include an attitude calculation unit for calculating an attitude of the second controller device. Then, the second camera setting unit sets an attitude of the second virtual camera based on the attitude of the second controller device.

With the configuration (12) above, the second player can change the image-capturing direction by changing the direction of the second virtual camera in accordance with the attitude of the second controller device, and can change the image-capturing direction by an intuitive and easy operation.

(13)

The second controller device may include an input device capable of direction input, and output second operation data which represents the direction input. Then, the second camera setting unit sets a position of the second virtual camera based on the second operation data.

With the configuration (13) above, the second player can easily move the second virtual camera using the input device.

(14)

Another example game system described in the present specification includes a game device, a first controller device, and a second controller device. The game system includes a game process unit, a first camera setting unit, a first image generation unit, a second camera setting unit, a second image generation unit, and an image information storage unit. The game process unit performs a predetermined game process based on first operation data representing an operation on the first controller device. The first camera setting unit sets a first virtual camera in a game space. The first image generation unit generates a first game image, which is a game image representing the game space as viewed from the first virtual camera and is a game image to be displayed on a predetermined display device separate from the second controller device. The second camera setting unit sets a second virtual camera which is arranged in the game space and is different from the first virtual camera based on the second operation data representing an operation on the second controller device. The second image generation unit generates a second game image which is a game image representing the game space as viewed from the second virtual camera and is a game image to be displayed on a display unit of the second controller device. The image information storage unit stores, in a predetermined storage device, image information regarding the second game image in response to an execution of a predetermined operation on the second controller device.

With the configuration (14) above, as with the configuration (1) above, the second virtual camera, which is controlled using the second controller device, is set in the game space of a game played using the first controller device. Therefore, the second player using the second controller device can operate the second virtual camera so as to display an image of the game space as viewed from a desired viewpoint and viewing direction on the display unit of the second controller device, and also to save the image by a predetermined operation. Thus, with the configuration (14) above, as with the configuration (1) above, the second player can capture images of the game space from a freer range of viewpoints, and save the game images. The second player can easily check images to be saved on the second controller device at hand, and can therefore more easily perform image-capturing (saving) operations.

The present specification also discloses an example game device included in the game systems of (1) to (14) above. The present specification also discloses an example non-transitory computer-readable storage device storing a game program which causes a computer of the game device to function as various units equivalent to those of the game device (which may not include the operation data obtaining unit and the image output units). The present specification also discloses a game process method to be carried out in the game system of the game device of (1) to (14) above.

With the game system, the game device, the storage medium storing a game program, and the game process method set forth above, a second virtual camera is set in the game space of the game played using the first controller device, wherein the second virtual camera is controlled by operations performed on the second controller device, and game images generated by the second virtual camera are saved in response to a predetermined operation. Therefore, the player using the second controller device can capture images in the game space from a freer range of viewpoints and save the game images, without being limited to the viewpoint of the game image displayed on the predetermined display device.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of the Game System]

Figure 1:
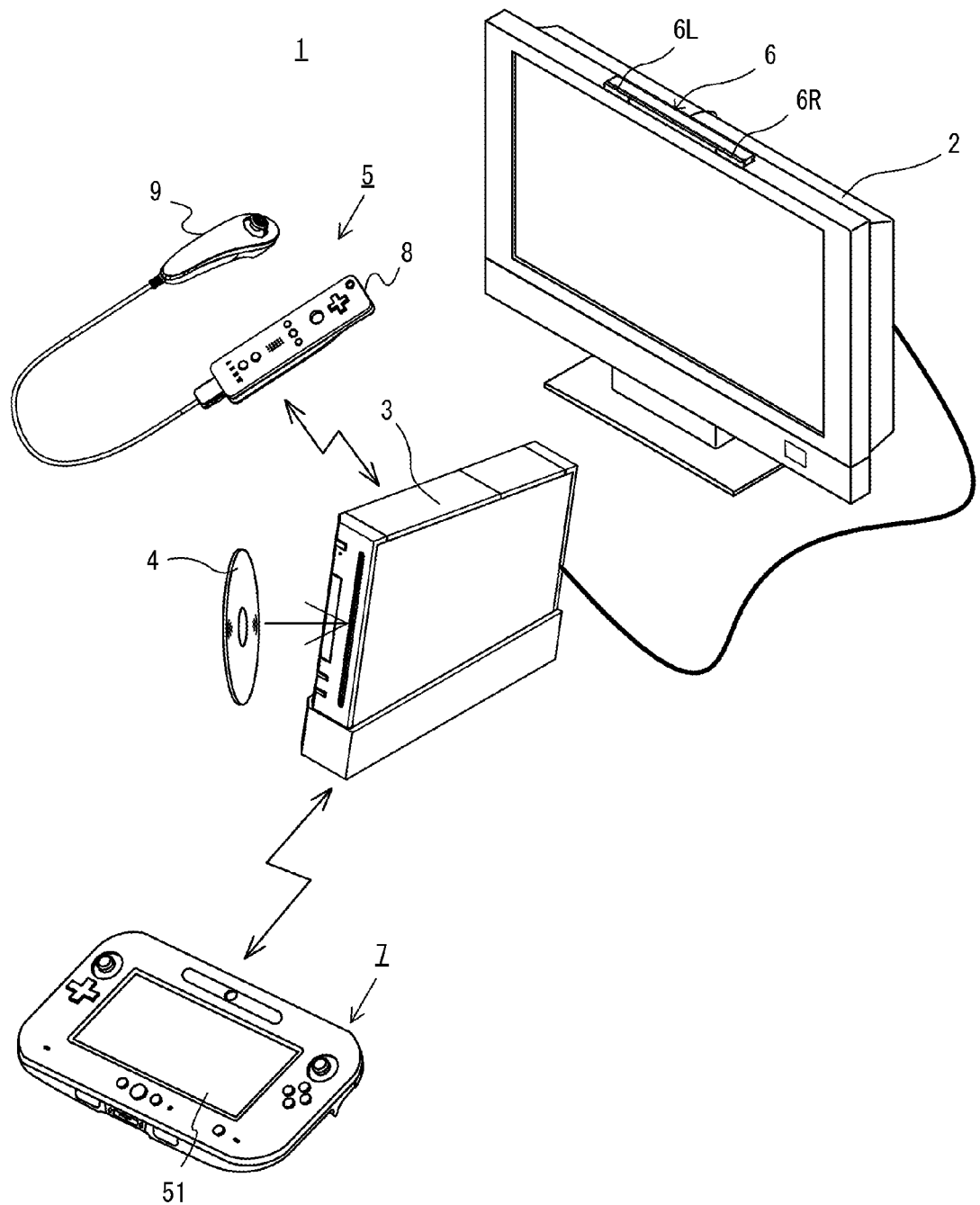
FIG. 1 is an external view of an example non-limiting game system.

A game system 1 according to an example embodiment will now be described with reference to the drawings. FIG. 1 is an external view of the game system 1. In FIG. 1, a game system 1 includes a stationary display device (hereinafter referred to as a "television") 2 such as a television receiver, a stationary game device 3, an optical disc 4, a controller 5, a marker device 6, and a terminal device 7. In the game system 1, a game device 3 performs game processes based on game operations performed using the controller 5 and or the terminal device 7, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and the speaker 2a outputs game sounds obtained as a result of the game process. In alternative example embodiments, the game device 3 and the stationary display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game device 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected in a wired connection (or a wireless connection) to the game device 3, and the game device 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game device 3 with operation data representing the contents of operations performed on the controller itself. In the present example embodiment, the controller 5 includes a main controller 8 and a sub-controller 9, and a sub-controller 9 is detachably attached to the main controller 8. The controller 5 and the game device 3 can wirelessly communicate with each other. In the present example embodiment, the wireless communication between the controller 5 and the game device 3 uses, for example, Bluetooth (Registered Trademark) technology. In other example embodiments, the controller 5 and the game device 3 may be connected by a wired connection. Furthermore, in FIG. 1, the game system 1 includes only one controller 5, but the game system 1 may include a plurality of controllers 5. That is, the game device 3 is capable of communicating with a plurality of controllers, so that by using a predetermined number of controllers at the same time, a plurality of people can play the game. The configuration of the controller 5 will be described in detail later.

The terminal device 7 is portable and is of a size that can be held by the user. The user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 74 to be described later). The terminal device 7 can communicate with the game device 3 wirelessly (or wired). The terminal device 7 receives data for images generated by the game device 3 (e.g., game images) from the game device 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the contents of operations performed thereon to the game device 3.

[2. Internal Configuration of the Game Device 3]

Figure 2:
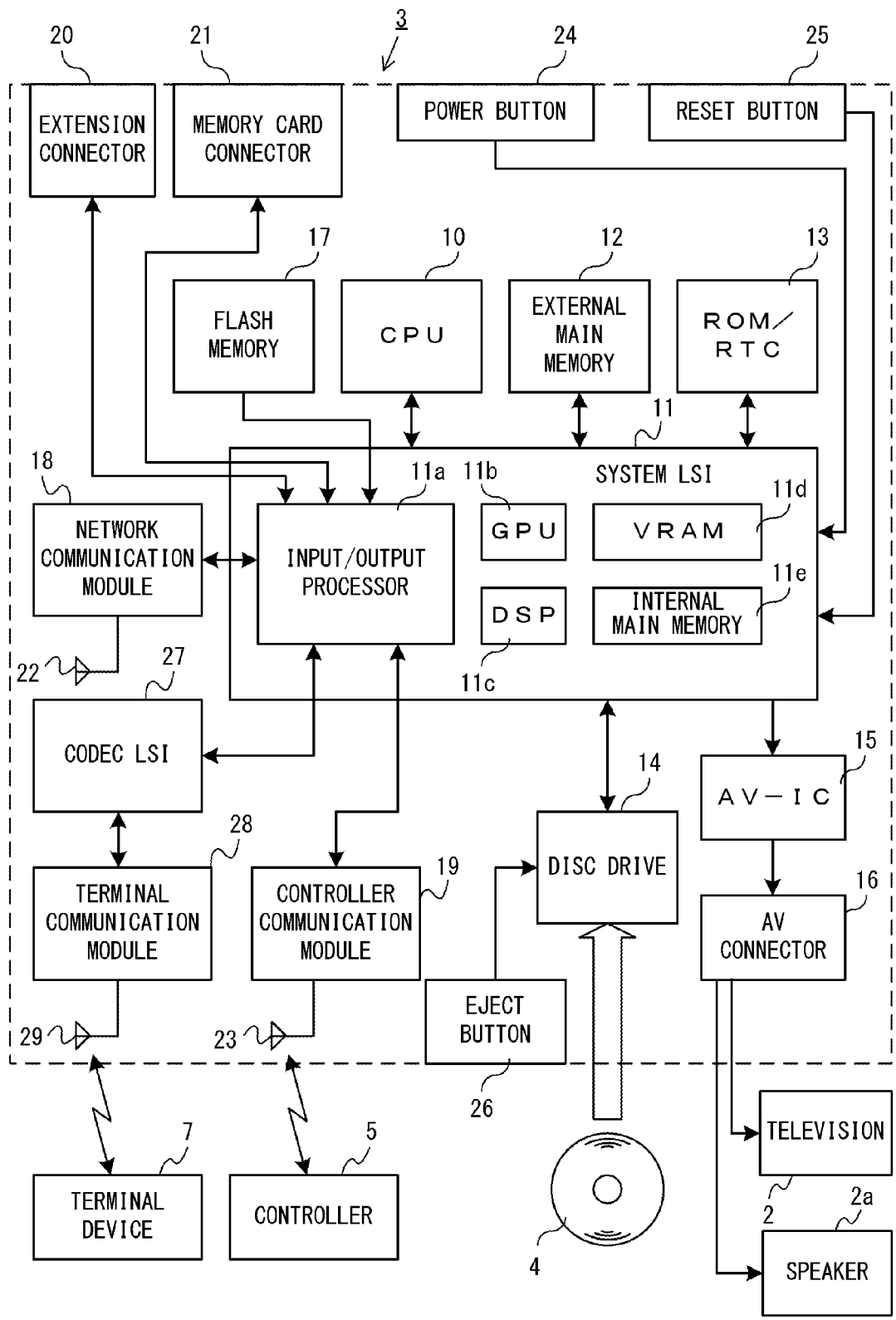
FIG. 2 is a block diagram showing an internal configuration of an example non-limiting game device.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, obtaining data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering unit, generates images in accordance with graphics commands (rendering commands) from the CPU 10. The VRAM 11d stores data (data such as polygon data and texture data) needed by the GPU 11b to execute the graphics commands. When images are generated, the GPU 11b generates image data using data stored in the VRAM 11d. Note that in the present example embodiment, the game device 3 generates both images (game images) to be displayed on the television 2 and images (game images) to be displayed on the terminal device 7. Hereinafter, the images to be displayed on the television 2 are referred to as the "television images" and the images to be displayed on the terminal device 7 are referred to as the "terminal images".

The DSP 11c, functioning as an audio processor, generates sound data using sound data and sound waveform (e.g., tone quality) data stored in one or both of the internal main memory 11e and the external main memory 12. Note that in the present example embodiment, sounds (game sounds) to be generated are classified into two types as in the case of the game images, one being outputted by the speaker of the television 2, the other being outputted by speakers of the terminal device 7. Hereinafter, in some cases, the sounds to be outputted by the television 2 are referred to as "television sounds", and the sounds to be outputted by the terminal device 7 are referred to as "terminal sounds".

Among the images and sounds generated by the game device 3 as described above, both image data and sound data to be outputted by the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted by the speaker 2a. While the connection scheme between the game device 3 and the television 2 may be any scheme, the game device 3 may transmit control commands for controlling the television 2 to the television 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the television 2, as when an HDMI cable is used, the game device 3 can turn ON the power of the television 2 or switch the input of the television 2 from one to another at any point in time.

Furthermore, among the images and sounds generated by the game device 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 is capable of connecting to a network such as the Internet to communicate with external information processing devices (e.g., other game devices and various servers). Specifically, the input/output processor 11a can be connected to a network such as the Internet via the network communication module 18 and the antenna 22, and can communicate with other devices connected to the network. The input/output processor 11a regularly accesses the flash memory 17, and detects the presence or absence of any data needed to be transmitted to the network, and when detected, transmits the data to the network via the network communication module 18 and the antenna 22. Further, the input/output processor 11a receives data transmitted from the external information processing devices and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and the external information processing devices. Moreover, the flash memory 17 may have a game program stored therein.

Furthermore, the game device 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game device 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game device 3 to the terminal device 7 is image data used in a game, and the playability of a game can be adversely influenced if there is a delay in the images displayed in the game. Therefore, delay may be avoided as much as possible in transmitting image data from the game device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game device 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method may use a high compression rate but may cause less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game device 3 transmits various control data to the terminal device 7 where appropriate. The control data is data representing an instruction to control a component included in the terminal device 7, e.g., an instruction to control lighting of a marker unit (a marker unit 55 shown in FIG. 12) or an instruction to control shooting by a camera (a camera 56 shown in FIG. 12). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game device 3 to the terminal device 7 may or may not be coded depending on the situation.

Furthermore, the game device 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game device 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game device 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied from an external power source to the components of the game device 3 via an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other example embodiments, some of the components of the game device 3 may be provided as extension devices separate from the game device 3. In this case, an extension device may be connected to the game device 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game device which does not include the above components, the game device can communicate with the terminal device 7.

[3. Configuration of the Controller 5]

Figure 3:
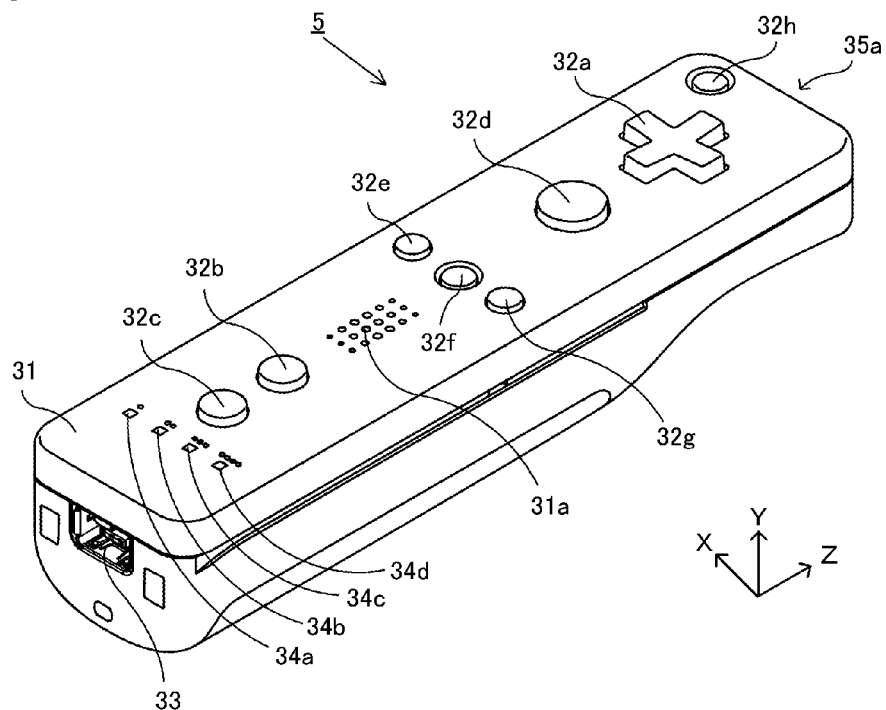
FIG. 3 is a perspective view showing an external configuration of an example non-limiting controller.
Figure 4:
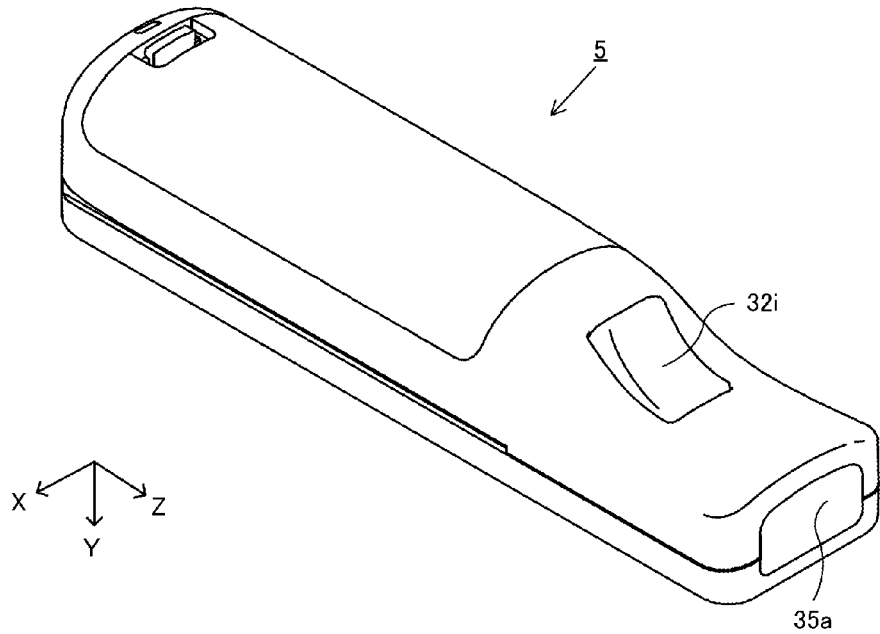
FIG. 4 is a perspective view showing an external configuration of the example non-limiting controller.

Next, with reference to FIGS. 3 to 7, the controller 5 will be described. As described above, the controller 5 includes the main controller 8 and the sub-controller 9. FIG. 3 is a perspective view illustrating an external configuration of the main controller 8. FIG. 4 is a perspective view illustrating an external configuration of the main controller 8. The perspective view of FIG. 3 shows the main controller 8 as viewed from the top rear side thereof, and the perspective view of FIG. 4 shows the main controller 8 as viewed from the bottom front side thereof.

As shown in FIG. 3 and FIG. 4, the main controller 8 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the main controller 8, and moving the main controller 8 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game device 3. Further, the power button 32h is intended to remotely turn ON/OFF the game device 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the main controller 8 to another device (e.g., the sub-controller 9 or another sensor unit). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 (the main controller 8) is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The main controller 8 has an image-capturing/processing unit 35 (FIG. 6), and a light incident surface 35a through which a light is incident on the image-capturing/processing unit 35 is provided on the front surface of the housing 31, as shown in FIG. 4. The light incident surface 35a is made of a material transmitting therethrough at least infrared light outputted by the markers 6R and 6L.

On the top surface of the housing 31, sound holes 31a for externally outputting a sound from a speaker 47 (shown in FIG. 5) incorporated in the main controller 8 is provided between the first button 32b and the home button 32f.

Figure 5:
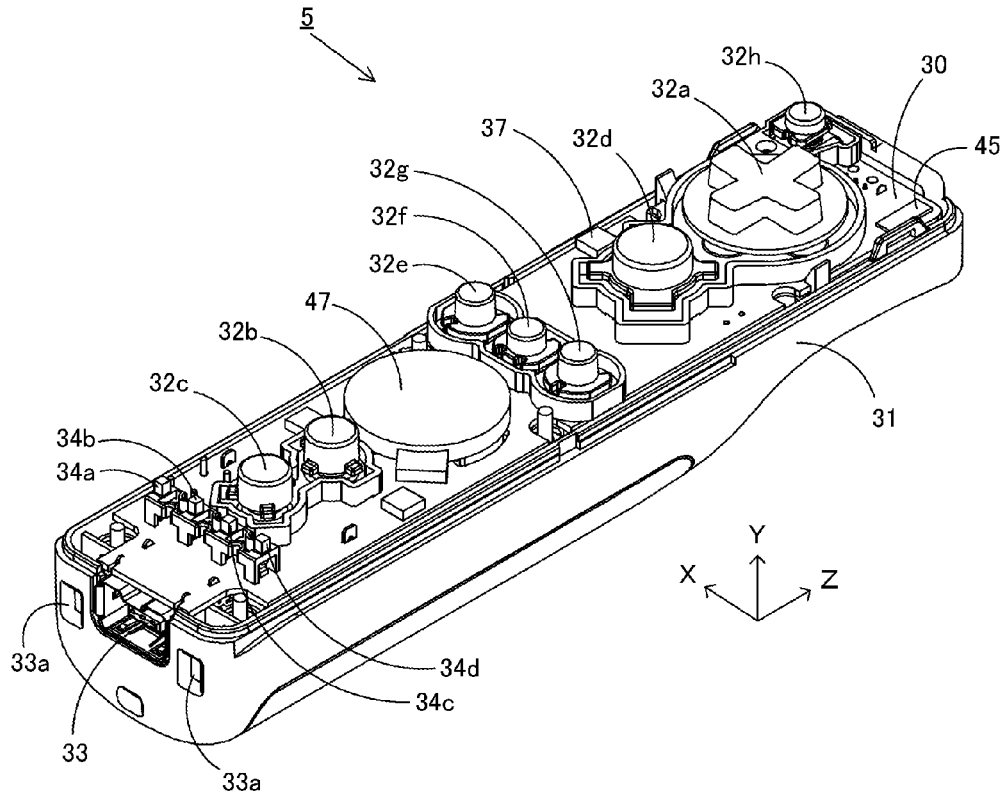
FIG. 5 is a diagram showing an internal configuration of the example non-limiting controller.
Figure 6:
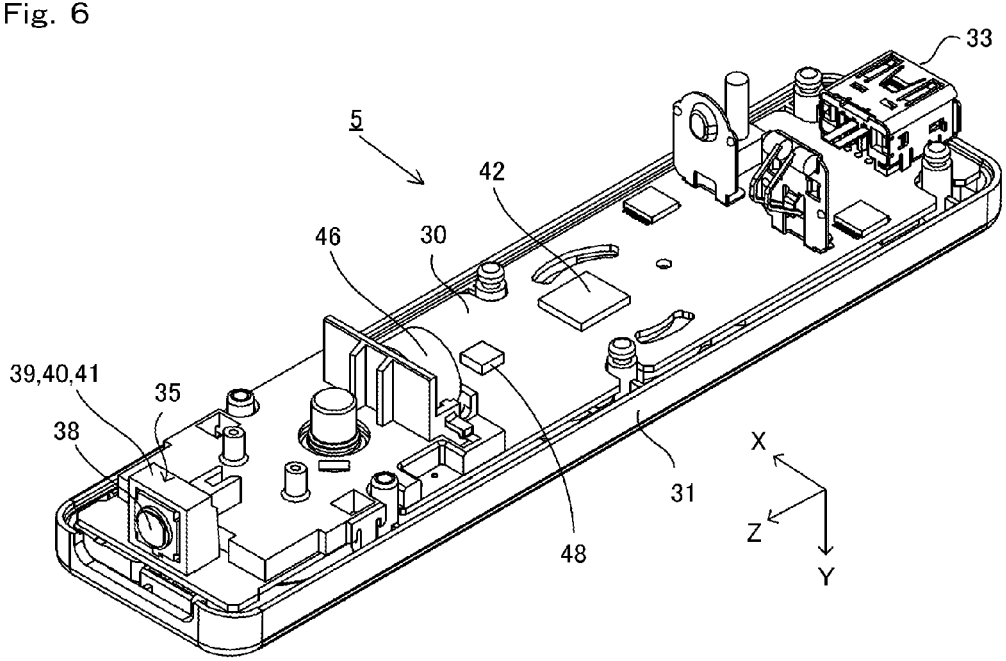
FIG. 6 is a diagram showing an internal configuration of the example non-limiting controller.

Next, with reference to FIGS. 5 and 6, an internal configuration of the main controller 8 will be described. FIGS. 5 and 6 are diagrams illustrating the internal configuration of the main controller 8. FIG. 5 is a perspective view illustrating a state where an upper casing (a part of the housing 31) of the main controller 8 is removed. FIG. 6 is a perspective view illustrating a state where a lower casing (a part of the housing 31) of the main controller 8 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, an acceleration sensor 37 is provided on a position offset from the center of the main controller 8 with respect to the X-axis direction. Thus, calculation of the movement of the main controller 8 being rotated about the Z-axis may be facilitated. Further, the acceleration sensor 37 is provided anterior to the center of the main controller 8 with respect to the longitudinal direction (Z-axis direction). Further, a wireless module 44 (see FIG. 6) and the antenna 45 allow the controller 5 (the main controller 8) to act as a wireless controller.

On the other hand, as shown in FIG. 6, at a front edge of a bottom main surface of the substrate 30, the image-capturing/processing unit 35 is provided. The image-capturing/processing unit 35 includes an infrared filter 38, a lens 39, an image-capturing element 40 and an image processing circuit 41 located in order, respectively, from the front of the main controller 8. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The main controller 8 is vibrated by actuation of the vibrator 46 based on a command from the microcomputer 42. Therefore, the vibration is conveyed to the user's hand holding the main controller 8, and thus a so-called vibration-feedback game is realized. In the present example embodiment, the vibrator 46 is disposed slightly toward the front of the housing 31. That is, the vibrator 46 is positioned offset from the center toward the end of the main controller 8, and therefore the vibration of the vibrator 46 can lead to enhancement of the vibration of the entire main controller 8. Further, the connector 33 is provided at the rear edge of the bottom main surface of the substrate 30. In addition to the components shown in FIGS. 5 and 6, the main controller 8 includes a quartz oscillator for generating a reference clock of the microcomputer 42, an amplifier for outputting a sound signal to the speaker 47, and the like.

Figure 7:
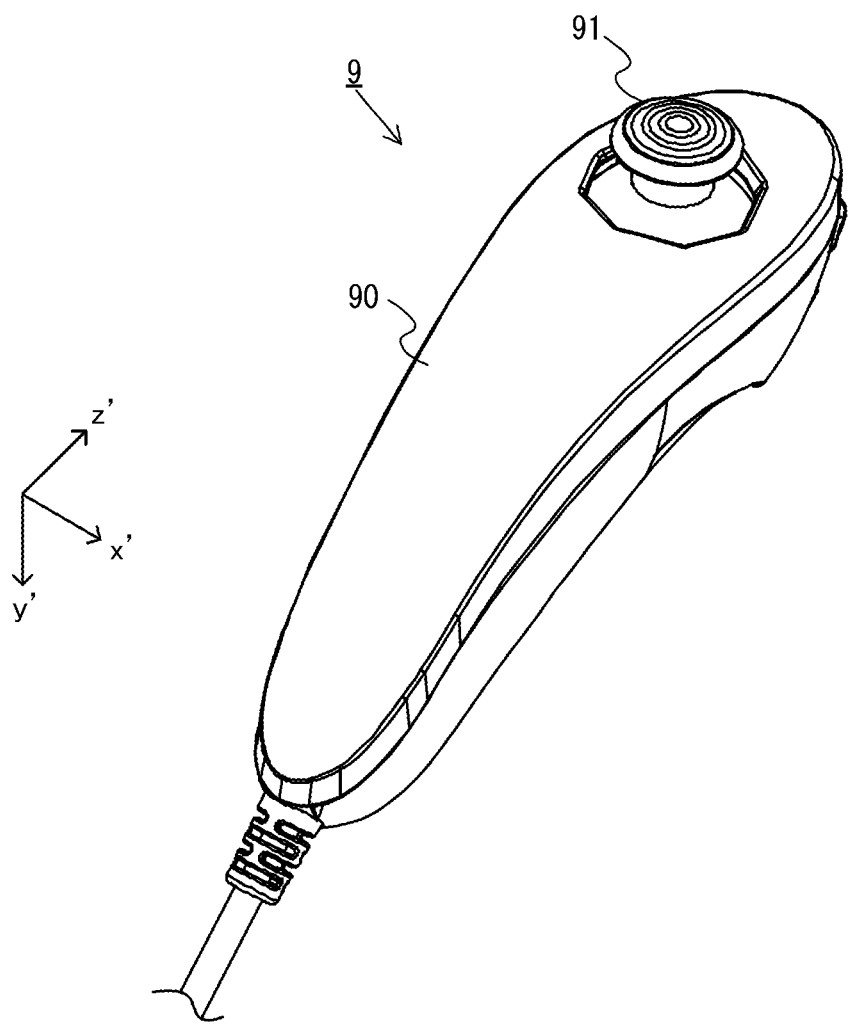
FIG. 7 is a block diagram showing a configuration of the example non-limiting controller.

FIG. 7 is a perspective view illustrating an external configuration of the sub-controller 9. The sub-controller 9 includes a housing 90 formed by, for example, plastic molding. As with the main controller 8, the housing 90 is sized as a whole to be held by a hand of an adult or a child. In the case of using the sub-controller 9 also, the player can perform game operations by operating buttons and sticks and changing the position and the direction of the sub-controller.

As shown in FIG. 7, the housing 90 has an analog joy stick 91 provided at the tip side (the z'-axis positive direction side) on the upper surface (the surface on the y'-axis negative direction side). Although not shown, the tip of the housing 90 has a surface slightly inclined backward, and a C button and a Z button are provided at the tip surface so as to be arranged vertically (the y-axis direction shown in FIG. 3). The analog joy stick 91 and these buttons (the C button and the Z button) are appropriately assigned their functions in accordance with game programs to be executed by the game device 3. Note that in some cases, an analog joy stick 91 and these buttons may be collectively referred to as an "operating unit 92 (see FIG. 8)".

Although not shown in FIG. 7, the sub-controller 9 also includes an acceleration sensor (acceleration sensor 93 shown in FIG. 8) inside the housing 90. In the present example embodiment, an acceleration sensor 93 is of the same type as the acceleration sensor 37 of the main controller 8. However, the acceleration sensor 93 may be of a different type from the acceleration sensor 37 and may detect acceleration about, for example, a predetermined one axis or two axes.

Furthermore, as shown in FIG. 7, the housing 90 is connected at the rear to one end of a cable. Although not shown in FIG. 7, the other end of the cable is attached to a connector (connector 94 shown in FIG. 8). The connector can be attached to the connector 33 of the main controller 8. That is, by attaching the connector 33 to the connector 94, the main controller 8 is attached to the sub-controller 9.

Note that FIGS. 3 to 7 only show examples of the shapes of the main controller 8 and the sub-controller 9, the shape of each operation button, the number and the positions of acceleration sensors and vibrators, and so on, and other shapes, numbers, and positions may be employed. Further, although in the present example embodiment, the imaging direction of the image-capturing means of the main controller 8 is the Z-axis positive direction, the imaging direction may be any direction. That is, the image-capturing/processing unit 35 (the light incident surface 35a through which a light is incident on the image-capturing/processing unit 35) of the controller 5 may not necessarily be provided on the front surface of the housing 31, but may be provided on any other surface on which a light can be received from the outside of the housing 31.

Figure 8:
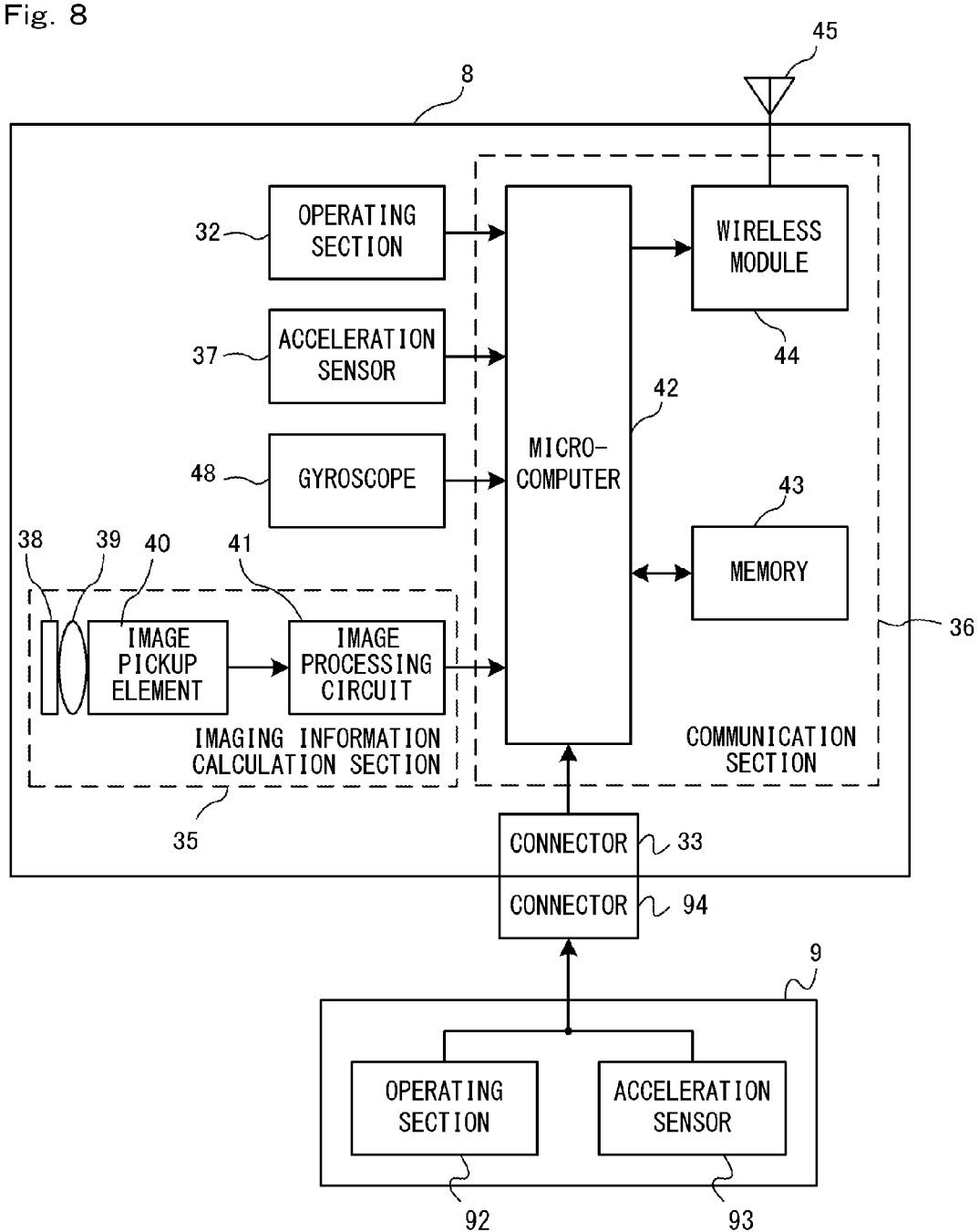
FIG. 8 is a diagram showing an external configuration of an example non-limiting terminal device.

FIG. 8 is a block diagram illustrating a configuration of the controller 5. As shown in FIG. 8, the main controller 8 includes an operating unit 32 (the operation buttons 32a to 32i), the image-capturing/processing unit 35, a communication unit 36, the acceleration sensor 37, and a gyroscope 48. The sub-controller 9 includes an operating unit 92 and an acceleration sensor 93. The controller 5 transmits, as operation data, data representing the content of an operation performed on the controller 5 itself, to the game device 3. Note that hereinafter, in some cases, operation data transmitted by the controller 5 is referred to as "controller operation data", and operation data transmitted by the terminal device 7 is referred to as "terminal operation data".

The operating unit 32 includes the operation buttons 32a to 32i described above, and outputs, to the microcomputer 42 of the communication unit 36, operation button data indicating an input state (that is, whether or not each operation button 32a to 32i is pressed) of each operation button 32a to 32i.

The image-capturing/processing unit 35 is a system for analyzing image data taken by the image-capturing means and calculating, for example, the centroid and the size of an area having a high brightness in the image data. The image-capturing/processing unit 35 has a maximum sampling period of, for example, about 200 frames/sec., and therefore can trace and analyze even a relatively fast motion of the controller 5.

The image-capturing/processing unit 35 includes the infrared filter 38, the lens 39, the image-capturing element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image-capturing element 40. The image-capturing element 40 is a solid-state imaging device such as, for example, a CMOS sensor or a CCD sensor, which receives the infrared light collected by the lens 39, and outputs an image signal. The marker unit 55 of the terminal device 7 and the marker device 6, which are subjects to be imaged, include markers for outputting infrared light. Therefore, the infrared filter 38 enables the image-capturing element 40 to receive only the infrared light transmitted through the infrared filter 38 and generate image data, so that an image of each subject to be imaged (the marker unit 55 and/or the marker device 6) can be taken with enhanced accuracy. Hereinafter, the image taken by the image-capturing element 40 is referred to as a captured image. The image data generated by the image-capturing element 40 is processed by the image processing circuit 41. The image processing circuit 41 calculates, in the captured image, the positions of subjects to be imaged. The image processing circuit 41 outputs data representing coordinate points of the calculated positions, to the microcomputer 42 of the communication unit 36. The data representing the coordinate points is transmitted as operation data to the game device 3 by the microcomputer 42. Hereinafter, the coordinate points are referred to as "marker coordinate points". The marker coordinate point changes depending on the attitude (angle of tilt) and/or the position of the controller 5 itself, and therefore the game device 3 is allowed to calculate the attitude and the position of the controller 5 using the marker coordinate point.

In another example embodiment, the controller 5 may not necessarily include the image processing circuit 41, and the controller 5 may transmit the captured image as it is to the game device 3. At this time, the game device 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection unit of the acceleration sensor 37 in the straight line direction along the sensing axis direction, among all accelerations applied to a detection unit of the acceleration sensor 37. For example, a multiaxial acceleration sensor having two or more axes detects an acceleration of a component for each axis, as the acceleration applied to the detection unit of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication unit 36. The acceleration detected by the acceleration sensor 37 changes depending on the attitude (angle of tilt) and the movement of the controller 5, and therefore the game device 3 is allowed to calculate the attitude and the movement of the controller 5 using the obtained acceleration data. In the present example embodiment, the game device 3 calculates the attitude, angle of tilt, etc., of the controller 5 based on the obtained acceleration data.

When a computer such as a processor (e.g., the CPU 10) of the game device 3 or a processor (e.g., the microcomputer 42) of the controller 5 processes an acceleration signal outputted by the acceleration sensor 37 (or similarly from an acceleration sensor 73 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another suitable parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication unit 36. Alternatively, the gyroscope 48 may simply detect an angular rate about one axis or angular rates about two axes.

Furthermore, the operating unit 92 of the sub-controller 9 includes the analog joy stick 91, the C button, and the Z button. The operating unit 92 outputs stick data and operation button data to the main controller 8 via the connector 94, and the particular stick data and operation button data (referred to as "sub stick data" and "sub operation button data", respectively) outputted by the operating unit 92 represent the direction and the amount of tilt of the analog stick 91 and the state of input with each button (as to whether the button has been pressed or not).

Furthermore, the acceleration sensor 93 of the sub-controller 9 is of the same type as the acceleration sensor 37 of the main controller 8, and detects accelerations (including a gravitational acceleration) of the sub-controller 9, i.e., force (including gravity) applied to the sub-controller 9. Among all accelerations applied to a detection unit of the acceleration sensor 38, the acceleration sensor 93 detects values for accelerations (linear accelerations) linearly applied along three predetermined axial directions. Data representing the detected accelerations (referred to as "sub acceleration data") is outputted to the main controller 8 via the connector 94.

In this manner, the sub-controller 9 outputs sub-controller data, including the sub stick data, the sub operation button data, and the sub acceleration data, to the main controller 8.

The communication unit 36 of the main controller 8 includes the microcomputer 42, memory 43, the wireless module 44 and the antenna 45. The microcomputer 42 controls the wireless module 44 for wirelessly transmitting, to the game device 3, data obtained by the microcomputer 42 while using the memory 43 as a storage area in the process.

The sub-controller data from the sub-controller 9 is inputted to the microcomputer 42 and temporarily stored to the memory 43. In addition, data outputted by the operating unit 32, the image-capturing/processing unit 35, the acceleration sensor 37, and the gyroscope 48 to the microcomputer 42 (referred to as "main controller data") is temporarily stored to the memory 43. Both the main controller and the sub-controller data are transmitted to the game device 3 as operation data (controller operation data). Specifically, at the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. The CPU 10 of the game device 3 performs the game process using the operation data obtained from the controller 5. The wireless transmission from the communication unit 36 to the controller communication module 19 is sequentially performed at a predetermined time interval. Since the game process is generally performed at a cycle of 1/60 sec. (corresponding to one frame time), data may be transmitted at a cycle of a shorter time period. The communication unit 36 of the controller 5 outputs, to the controller communication module 19 of the game device 3, the operation data at intervals of 1/200 seconds, for example.

As described above, the main controller 8 can transmit marker coordinate data, acceleration data, angular rate data, and operation button data as operation data representing operations performed thereon. The sub-controller 9 can transmit acceleration data, stick data, and operation button data as operation data representing operations performed thereon. In addition, the game device 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the main controller 8 and/or the sub-controller 9 to arbitrary attitudes, pointing the main controller 8 to arbitrary positions on the screen, and moving the main controller 8 and/or the sub-controller 9.

Also, in the present example embodiment, the controller 5 is not provided with any display means for displaying game images, but the controller 5 may be provided with a display means for displaying an image or suchlike to indicate, for example, a remaining battery level.

[4. Configuration of Terminal Device 7]

Figure 9:
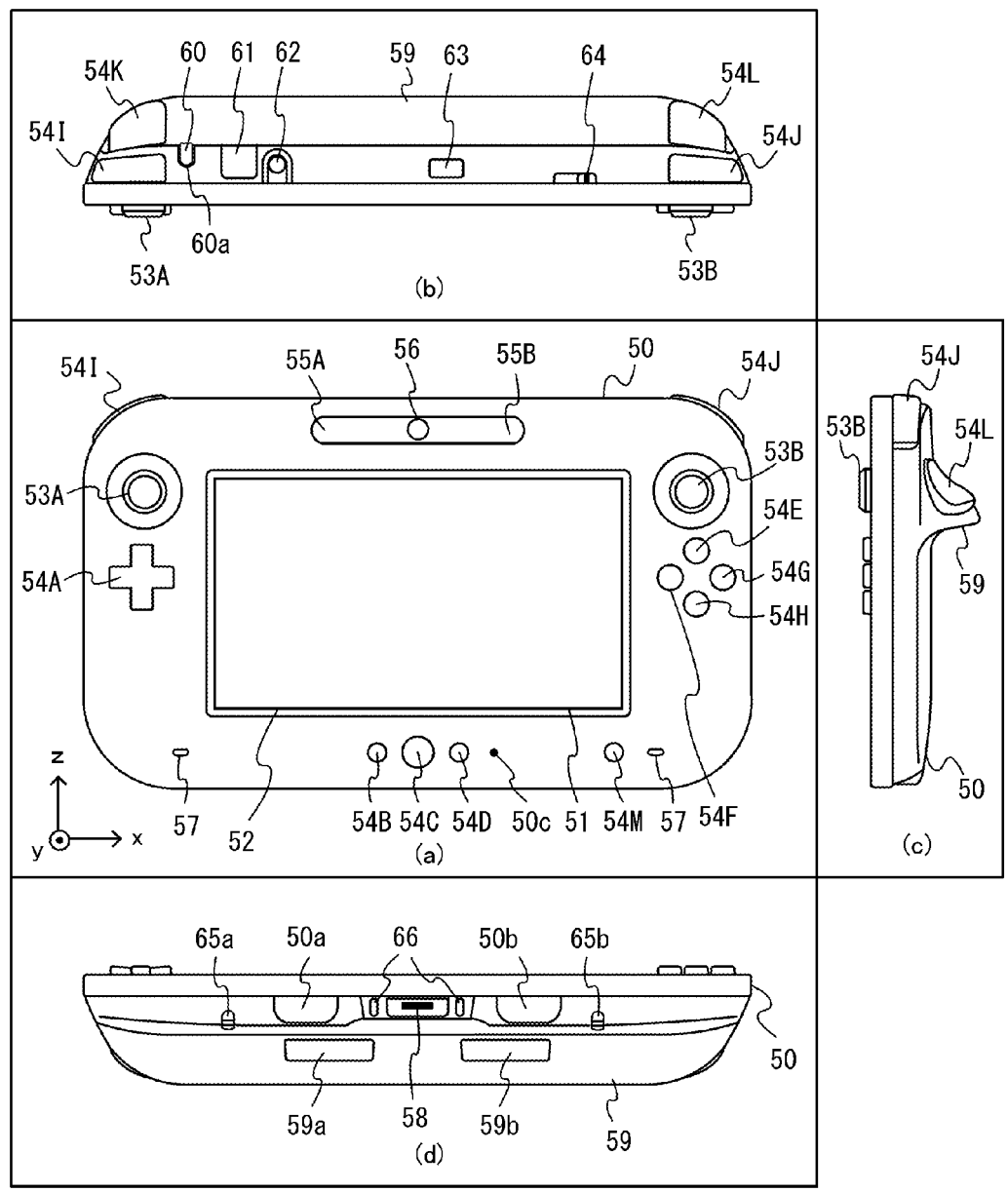
FIG. 9 is a diagram showing an external configuration of the example non-limiting terminal device.
Figure 10:
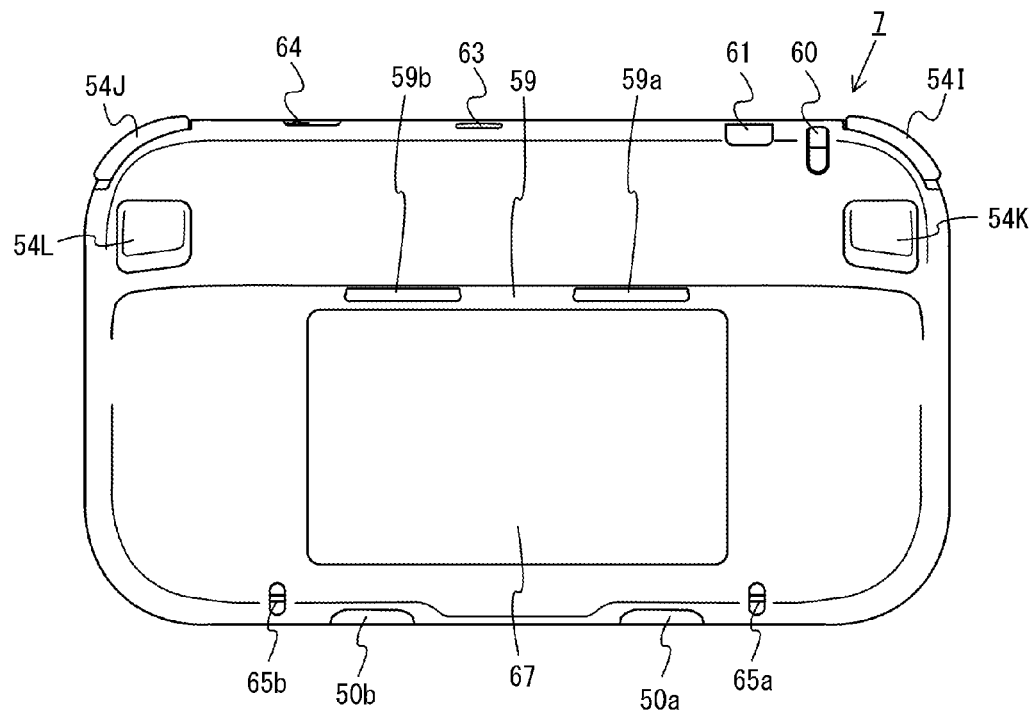
FIG. 10 is a back view of the example non-limiting terminal device.
Figure 11:
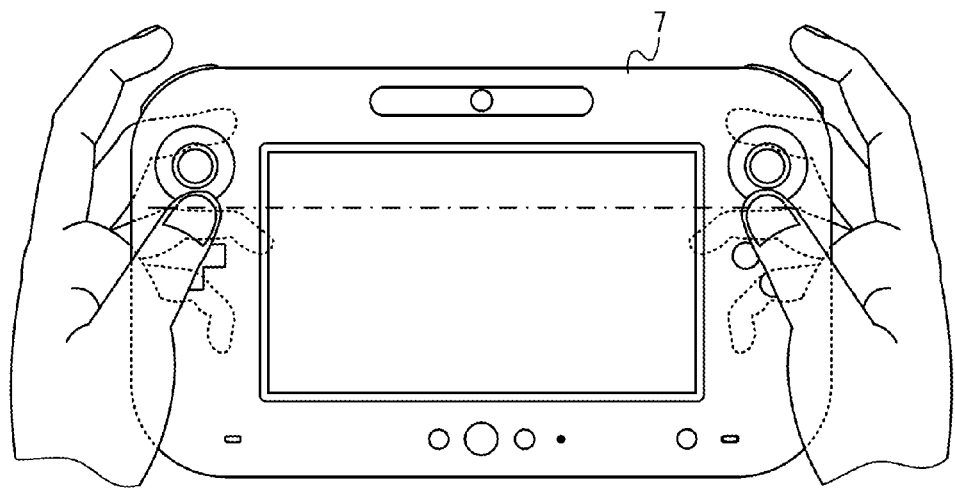
FIG. 11 is a diagram showing a user holding the terminal device in a landscape position.

Next, a configuration of a terminal device 7 will be described with reference to FIGS. 9 to 12. FIG. 9 is a plan view showing an external configuration of the terminal device 7. FIG. 9(a) is a front view of the terminal device 7, FIG. 9(b) is a top view thereof, FIG. 9(c) is a right side view thereof, and FIG. 9(d) is a bottom view thereof. FIG. 10 is a back view of the terminal device 7. FIG. 11 is a diagram showing a user holding the terminal device 7 in a landscape position.

As shown in FIG. 9, the terminal device 7 includes a housing 50 generally in a horizontally-elongated rectangular plate shape. That is, it can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. The longitudinal (z-axis direction) length of the terminal device 7 is 100 to 150 [mm], for example, and is 133.5 [mm] in the present embodiment. The widthwise (x-axis direction) length of the terminal device 7 is 200 to 250 [mm], for example, and is 228.26 [mm] in the present embodiment. The thickness (the length in the y-axis direction) of the terminal device 7 is about 15 to about 30 [mm] in a plate-shaped portion and about 30 to about 50 [mm] including the thickest part, and is 23.6 (40.26 in the thickest part) [mm] in the present embodiment. The weight of the terminal device 7 is about 400 to about 600 [g], and is 530 [g] in the present embodiment. Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The size of the screen of the LCD 51 is 5 inches or larger, for example, and is herein 6.2 inches. The controller device 7 of the present embodiment has such a configuration that it is easily held and operated, and it is therefore easy to operate even if a large LCD is provided. In other embodiments, the controller device 7 may be of a relatively small size with the provision of a smaller LCD 51. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIG. 11. While FIG. 11 show an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 9(*a*), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, the present invention is not limited to using the touch pen 60, and an input may be made on the touch panel 52 with a finger of the user. The housing 50 is provided with a hole 60*a* for accommodating the touch pen 60 used for performing operations on the touch panel 52 (see FIG. 9(*b*)). While the hole 60*a* is provided on the upper surface of the housing 50 so that the touch pen 60 does not fall, it may be provided on the side surface or the bottom surface. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 9, the terminal device 7 includes two analog sticks 53A and 53B and a plurality of buttons (keys) 54A to 54M, as operation mechanisms (operation sections). The analog sticks 53A and 53B are each a direction-specifying device. The analog sticks 53A and 53B are each configured so that the movable member (stick portion) operated with a finger of the user can be slid in any direction (at any angle in the up, down, left, right and diagonal directions) with respect to the surface of the housing 50. That is, it is a direction input device which is also called a slide pad. The movable member of each of the analog sticks 53A and 53B may be of such a type that it is tilted in any direction with respect to the surface of the housing 50. Since the present embodiment use analog sticks of such a type that the movable members slide, the user can operate the analog sticks 53A and 53B without significantly moving the thumbs, and therefore operations can be made while the housing 50 is held more firmly. When analog sticks of such a type that the movable members tilt are used as the analog sticks 53A and 53B, the degree of input (the degree of tilt) is better perceived by the user, thus allowing the user to more easily perform precise operations.

The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 11, the analog sticks 53A and 53B are provided at such positions that the user can operate them while holding the left and right portions of the terminal device 7 (the left and right opposing end portions with respect to the LCD 51), and therefore the user can easily operate the analog sticks 53A and 53B even when holding and moving the terminal device 7.

The buttons 54A to 54L are operation mechanisms (operation sections) for making predetermined inputs, and are keys that can be pressed. As will be discussed below, the buttons 54A to 54L are provided at such positions that the user can operate them while holding the left and right portions of the terminal device 7 (see FIG. 11). Therefore, the user can easily operate these operation mechanisms even when holding and moving the terminal device 7.

As shown in FIG. 9(*a*), the cross button (direction-input button) 54A and the buttons 54B to 54H and 54M, of the operation buttons 54A to 54L, are provided on the front surface of the housing 50. That is, these buttons 54A to 54H and 54M are provided at positions at which they can be operated by the thumbs of the user (see FIG. 11).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game device 3 can be remotely turned ON/OFF by operating the power button 54M. The power button 54M is provided on the lower side of the LCD 51 as are the buttons 54B to 54D. The power button 54M is provided on the right side of the buttons 54B to 54D. Thus, the power button 54M is provided at a position at which it can be operated (easily operated) with the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, the analog sticks 53A and 53B are provided above the cross button 54A and the buttons 54E to 54H. Here, the analog sticks 53A and 53B protrude beyond the cross button 54A and the buttons 54E to 54H in the thickness direction (the y-axis direction). Therefore, if the positions of the analog stick 53A and the cross button 54A are reversed, the thumb of the user may inadvertently touch the analog stick 53A when the user is operating the cross button 54A with the thumb. A similar problem occurs also when the positions of the analog stick 53B and the buttons 54E to 54H are reversed. In contrast, in the present embodiment, since the analog sticks 53A and 53B are provided above the cross button 54A and the buttons 54E to 54H, the possibility that a finger may inadvertently touch the cross button 54A and the buttons 54E to 54H when the user is operating the analog sticks 53A and 53B is small. Thus, in the present embodiment, the possibility of erroneous operations can be reduced, and it is possible to improve the controllability of the terminal device 7. Note however that in other embodiments, the positions of the analog stick 53A and the cross button 54A may be reversed and the positions of the analog stick 53B and the buttons 54E to 54H may be reversed as necessary.

Here, in the present embodiment, some operation sections (the analog sticks 53A and 53B, the cross button 54A, and the three buttons 54E to 54G) are provided on the left and right opposing sides of the display section (the LCD 51) and above the center of the housing 50 in the up/down direction (y-axis direction). When operating these operation sections, the user primarily holds a portion of the terminal device 7 that is above the center thereof in the up/down direction. If the user holds the lower portion of the housing 50, the terminal device 7 to be held becomes unstable, making it more difficult for the user to hold the terminal device 7. In contrast, in the present embodiment, when operating the operation section, the user primarily holds a portion of the terminal device 7 that is above the center thereof in the up/down direction, and the housing 50 can be supported from the sides by the palms. Therefore, the user can stably hold the housing 50 and it is made easier to hold the terminal device 7, thus making it easier to operate the operation section. In other embodiments, operation sections are provided, at least one on the left and one on the right of the display section, above the center of the housing 50. For example, only the analog sticks 53A and 53B may be provided above the center of the housing 50. For example, in a case in which the cross button 54A is provided above the left analog stick 53A and the four buttons 54E to 54H are provided above the right analog stick 53B, the cross button 54A and the four buttons 54E to 54H may be provided above the center of the housing 50.

In the present embodiment, a projecting portion (an eaves portion 59) is provided on the back side of the housing 50 (the side opposite to the front surface where the LCD 51 is provided) (see FIGS. 9(c) and 10). As shown in FIG. 9(c), the eaves portion 59 is a mountain-shaped member which is projecting from the back surface of the generally plate-shaped housing 50. The projecting portion has such a height (thickness) that it can rest on fingers of the user holding the back surface of the housing 50. The height of the projecting portion is 10 to 25 [mm], for example, and is 16.66 [mm] in the present embodiment. The bottom surface of the projecting portion may have an inclination of 45° or more (more preferably 60° or more) with respect to the back surface of the housing 50 so that the projecting portion easily rests on fingers of the user. As shown in FIG. 9(c), the bottom surface of the projecting portion may have a larger inclination angle than the upper surface. As shown in FIG. 11, the user can hold the terminal device 7 stably without getting tired even if the terminal device 7 has a relatively large size by holding the terminal device 7 while resting fingers on the eaves portion 59 (placing the eaves portion 59 on the fingers). That is, the eaves portion 59 can be referred to as a supporting member by means of which the housing 50 is supported by fingers, and can be referred to also as a finger-resting portion.

The eaves portion 59 is provided above the center of the housing 50 with respect to the up/down direction. The eaves portion 59 is provided on the reverse side so as to generally correspond to the operation sections (the analog sticks 53A and 53B) which are provided on the front surface of the housing 50. That is, the projecting portion is provided so as to extend across an area on the reverse side including positions corresponding to the operation sections which are provided respectively on the left side and on the right side of the display section. Therefore, when operating the operation section, the user can hold the terminal device 7 so as to support the eaves portion 59 with the middle fingers or the ring fingers (see FIG. 11). Then, it is easier to hold the terminal device 7, and it is easier to operate the operation sections. In the present embodiment, since the projecting portion has an eaves-like shape extending in the left/right direction, the user can hold the terminal device 7 with the middle fingers or the ring fingers placed along the bottom surface of the projecting portion, making it easier to hold the terminal device 7. The eaves portion 59 is not limited to the shape extending in the horizontal direction as shown in FIG. 10, as long as it is formed so that it (i.e., a portion thereof that is projecting) extends in the left/right direction. In other embodiments, the eaves portion 59 may extend in a direction that is slightly inclined from the horizontal direction. For example, the eaves portion 59 may be provided so as to be inclined upwardly (or downwardly) from the left and right opposing end portions toward the center.

The present embodiment employs the eaves portion 59 having a shape of an eaves as the projecting portion formed on the back surface of the housing for the purpose of providing engagement holes to be described below in the eaves portion 59, but the projecting portion may have any other suitable shape. For example, in other embodiments, two projecting portions may be provided in the left and right opposing portions (with no projecting portion in the center of the left/right direction) on the back side of the housing 50 (see FIG. 29). In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eaves portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 may include a down-facing surface (the bottom surface of the projecting portion) formed in the left and right opposing portions of the back surface. Then, the user can easily hold the controller device with fingers abutting against this surface.

While the "down-facing surface" may be provided at any position on the back surface of the housing 50, it may be located above the center of the housing 50.

As shown in FIGS. 9(*a*), 9(*b*) and 9(*c*), a first L button 54I and a first R button 54J are provided respectively in the right and left opposing portions on the upper surface of the housing 50. In the present embodiment, the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface (in other words, it is exposed on both the upper and left side surfaces). The first R button 54J is provided at the right end of the upper side surface of the housing 50, and is exposed on the upper right side surface (in other words, it is exposed on both the upper and right side surfaces). Thus, the first L button 54I is provided at such a position that it can be operated with the left index finger of the user, and the first R button 54J is provided at such a position that it can be operated with the right index finger of the user (see FIG. 11). In other embodiments, the operation sections provided respectively in the left and right portions of the upper surface of the housing 50 do not have to be provided at the left end and the right end, and may be provided at positions other than the end portions. The operation sections may be provided respectively on the left and right side surfaces of the housing 50.

As shown in FIGS. 9(*c*) and 10, a second L button 54K and a second R button 54L are provided on the projecting portion (the eaves portion 59). The second L button 54K is provided near the left end of the eaves portion 59. The second R button 54L is provided near the right end of the eaves portion 59. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to (generally) correspond to the left analog stick 53A provided on the front surface, and the second R button 54L is provided on the reverse side so as to (generally) correspond to the right analog stick 53B provided on the front surface. Thus, the second L button 54K is provided at a position at which it can be operated with the left middle finger (or left index finger) of the user, and the second R button 54L is provided at a position at which it can be operated with the right middle finger (or right index finger) of the user (see FIG. 11). The second L button 54K and the second R button 54L are provided on the upper surface of the eaves portion 59 as shown in FIG. 9(*c*). Therefore, the second L button 54K and the second R button 54L have upwardly-facing (diagonally-upwardly-facing) button surfaces. It is believed that the middle fingers or the index fingers will generally move in the up/down direction when the user holds the terminal device 7, and it will be easier for the user to press the second L button 54K and the second R button 54L if the button surfaces are facing upward.

As described above, in the present embodiment, operation sections (the analog sticks 53A and 53B) are provided respectively on the left side and the right side of the display section (the LCD 51) above the center of the housing 50, and other operation sections (the second L button 54K and the second R button 54L) are provided on the back side of the housing 50 so as to generally correspond respectively to the operation sections. Thus, since the operation sections and the other operation sections are provided on the front side and on the back side of the housing 50 so as to generally correspond to each other, the user can hold the housing 50 so as to sandwich the housing 50 from the front side and from the back side when operating these operation sections. When operating these operation sections, the user holds a portion of the housing 50 that is above the center thereof in the up/down direction, and therefore the terminal device 7 can be held in the upper portion thereof and the terminal device 7 can be supported by the palms (see FIG. 11). Thus, the user can stably hold the housing 50 in a state in which the user can operate at least four operation sections, and it is therefore possible to provide a controller device (the terminal device 7) which can be easily held by the user and which has a good controllability.

As described above, in the present embodiment, the user can easily hold the terminal device 7 by holding the terminal device 7 with fingers abutting against the bottom surface of the projecting portion (the eaves portion 59). Since the second L button 54K and the second R button 54L are provided on the upper surface of the projecting portion, the user can easily operate these buttons in such a state as described above. The user can easily hold the terminal device 7 in the following manner, for example.

That is, as shown in FIG. 11, the user can hold the terminal device 7 with the ring fingers abutting against the bottom surface of the eaves portion 59 (the one-dot-chain line shown in FIG. 11) (so as to support the eaves portion 59 with the ring fingers). Then, the user can operate the four buttons (the first L button 54I, the first R button 54J, the second L button 54K and the second R button 54L) with the index fingers and the middle fingers. For example, in a case in which required game operations are relatively complicated and many buttons are to be used, it is possible to easily operate many buttons by holding the terminal device 7 as shown in FIG. 11. Since the analog sticks 53A and 53B are provided above the cross button 54A and the buttons 54E to 54H, the user can advantageously operate the analog sticks 53A and 53B with the thumbs when relatively complicated operations are required. In FIG. 11, the user holds the terminal device 7 with the thumbs abutting against the front surface of the housing 50, the index fingers against the upper surface of the housing 50, the middle fingers against the upper surface of the eaves portion 59 on the back surface of the housing 50, the ring fingers against the bottom surface of the eaves portion 59, and the little fingers against the back surface of the housing 50. Thus, the user can firmly hold the terminal device 7 as if to wrap around the housing 50 from four directions.

The user can also hold the terminal device 7 with the middle fingers abutting against the bottom surface of the eaves portion 59. Then, the user can easily operate two buttons (the second L button 54K and the second R button 54L) with the index fingers. For example, in a case in which required game operations are relatively simple and only a few buttons are to be used, the terminal device 7 may be held with the middle fingers abutting against the bottom surface of the eaves portion 59. Then, since the user can hold the lower side of the housing 50 with two fingers (the ring finger and the little finger), it is possible to firmly hold the terminal device 7.

In the present embodiment, the eaves portion 59 is provided so that the bottom surface thereof is located between the analog sticks 53A and 53B and the cross button 54A and the four buttons 54E to 54H (so that it is located on the lower side of the analog sticks 53A and 53B and above the cross button 54A and the four buttons 54E to 54H). Therefore, in a case in which the terminal device 7 is held with the ring fingers abutting against the eaves portion 59 (FIG. 11), the analog sticks 53A and 53B can be easily operated with the thumbs, and in a case in which the terminal device 7 is held with the middle fingers abutting against the eaves portion 59, the cross button 54A and the four buttons 54E to 54H can be easily operated with the thumbs. That is, in either of the two cases, the user can make a direction input operation while firmly holding the terminal device 7.

As described above, the user can also hold the terminal device 7 in a portrait position. That is, the user can hold the terminal device 7 in a portrait position by holding the top side or the lower side of the terminal device 7 with one hand. Thus, since the user can hold the terminal device 7 with one hand, it is possible to for example perform an operation in which the terminal device 7 is held with one hand while an input is made to the touch panel 52 with the other hand.

In a case in which the top side of the terminal device 7 is held, the user can firmly hold the terminal device 7 by having fingers other than the thumbs abutting against the bottom surface of the eaves portion 59. In the present embodiment, since the eaves portion 59 extends in the left/right direction, the user can abut fingers other than the thumbs against the eaves portion 59 and firmly hold the terminal device 7, irrespective of the position along the top side of the terminal device 7 at which the user holds the terminal device 7. That is, in a case in which the terminal device 7 is used in a portrait position, the eaves portion 59 can be used as a grip. On the other hand, in a case in which the bottom side of the terminal device 7 is held with one hand, the user can operate the buttons 54B to 54D with that hand. Therefore, it is possible for example to operate the buttons 54B to 54D with the hand with which the terminal device 7 is held while making inputs to the touch panel 52 with the other hand, thereby allowing for more operations.

With the terminal device 7 of the present embodiment, since the projecting portion (the eaves portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eaves portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eaves portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc. The terminal device 7 may include a button for turning ON/OFF the power of the LCD 51, and a button for performing a connection setting (pairing) with the game device 3.

As shown in FIG. 9(*a*), the terminal device 7 includes the marker section 55 including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 9, the camera 56 is provided on the front surface of the housing 50 in the present embodiment. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 79 as a sound input mechanism. A microphone hole 50*c* is provided on the front surface of the housing 50. The microphone 79 is provided inside the housing 50 behind the microphone hole 50*c*. The microphone 79 detects sounds around the terminal device 7 such as the voice of the user.

The terminal device 7 includes a speaker 77 as a sound output mechanism. As shown in FIG. 9(*d*), speaker holes 57 are provided in a lower portion of the front surface of the housing 50. The output sounds from the speaker 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speaker 77. The terminal device 7 includes a sound output terminal 62 for receiving a sound output section such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing 50 so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. In the present embodiment, the extension connector 58 is provided on the lower side surface of the housing 50 as shown in FIG. 9(*d*). The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7. In the present embodiment, the charging terminal 66 is provided on the lower side surface of the housing 50. Therefore, when the terminal device 7 and an additional device are connected to each other, it is possible to supply power from one to the other, in addition to exchanging information therebetween, via the extension connector 58. Thus, with the provision of the charging terminal 66 around (on the left and right opposing sides of) the extension connector 58, it is possible to supply power, as well as exchange information, when the terminal device 7 and an additional device are connected to each other. The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger. Although the charging connector (the cover portion 61) is provided on the upper side surface of the housing 50 in view of the fact that an additional device is connected to the lower side surface of the housing in the present embodiment, it may be provided on the left and right side surfaces or the lower side surface.

As shown in FIGS. 9(d) and 10, engagement holes 59a and 59b with which tab portions of an additional device can engage are provided on the bottom surface of the projecting portion (the eaves portion 59). The engagement holes 59a and 59b are used when connecting an additional device to the terminal device 7. That is, the additional device includes tab portions which can engage with the engagement holes 59a and 59b, and when connecting the additional device to the terminal device 7, the tab portions are engaged with the engagement holes 59a and 59b, thereby securing the terminal device 7 and the additional device with each other. Threaded holes may be further provided inside the engagement holes 59a and 59b so that the additional device can be securely fixed by screws. The projecting portion provided on the back surface of the terminal device 7 is herein the eaves portion 59 having an eaves-like shape. That is, the eaves portion 59 is provided so as to extend in the left/right direction. As shown in FIG. 10, the engagement holes 59a and 59b are provided near the center (with respect to the left/right direction) of the bottom surface of the eaves portion 59. While the number of the engagement holes 59a and 59b provided on the bottom surface of the eaves portion 59 is not limited to any particular number, if there is one engagement hole, it may be provided at the center of the eaves portion 59, and if there are a plurality of engagement holes, they may be provided in left-right symmetry. Then, the additional device can be stably connected while evenly maintaining the left-right balance. In a case in which the engagement holes are provided near the center, the size of the additional device can be reduced. Thus, the eaves portion 59 can be used as a member for engaging the additional device.

In the present embodiment, engagement holes 50a and 50b are provided on the bottom surface of the housing 50 as shown in FIG. 9(d). Therefore, in a case in which the additional device is connected to the terminal device 7, four tab portions are respectively engaged with four engagement holes, thereby securing the terminal device 7 and the additional device with each other. Thus, the additional device can be more securely connected to the terminal device 7. Threaded holes may be provided also inside the engagement holes 50a and 50b so that the additional device can be screwed thereto. While screwing may be done at any position, the support portion of the additional device, which lies against the reverse surface of the housing 50, and the eaves portion 59 may be screwed together, for example. In other embodiments, the engagement holes provided in the housing may be in any arrangement.

The terminal device 7 includes a battery cover 67 which can be attached to and removed from the housing 50. A battery (a battery 85 shown in FIG. 12) is placed inside the battery cover 67. In the present embodiment, the battery cover 67 is provided on the back side of the housing 50, below the projecting portion (the eaves portion 59).

The housing 50 of the terminal device 7 includes holes 65a and 65b through which a strap cord can be tied to the terminal device 7. As shown in FIG. 9(d), the holes 65a and 65b are provided on the bottom surface of the housing 50 in the present embodiment. Two holes 65a and 65b are provided in the present embodiment, one in the left portion and another in the right portion of the housing 50. Specifically, the hole 65a is provided on the left side of the center of the bottom surface of the housing 50, and the hole 65b is provided on the right side of the center of the bottom surface of the housing 50. The user can tie a strap to one of the holes 65a and 65b, and fasten the strap to the wrist of the user. Then, even if the user drops the terminal device 7 or if the terminal device 7 comes off the hand, the terminal device 7 is prevented from falling or hitting other objects. In the present embodiment, since the holes are provided both in the left and right portions, the user can conveniently fasten a strap to either hand.

With the terminal device 7 shown in FIGS. 9 to 12, the shape of each operation button, the shape of the housing 50, the number and the positions of the components, etc., are merely illustrative, and the present invention can be realized with other shapes, numbers, and positions.

Figure 12:
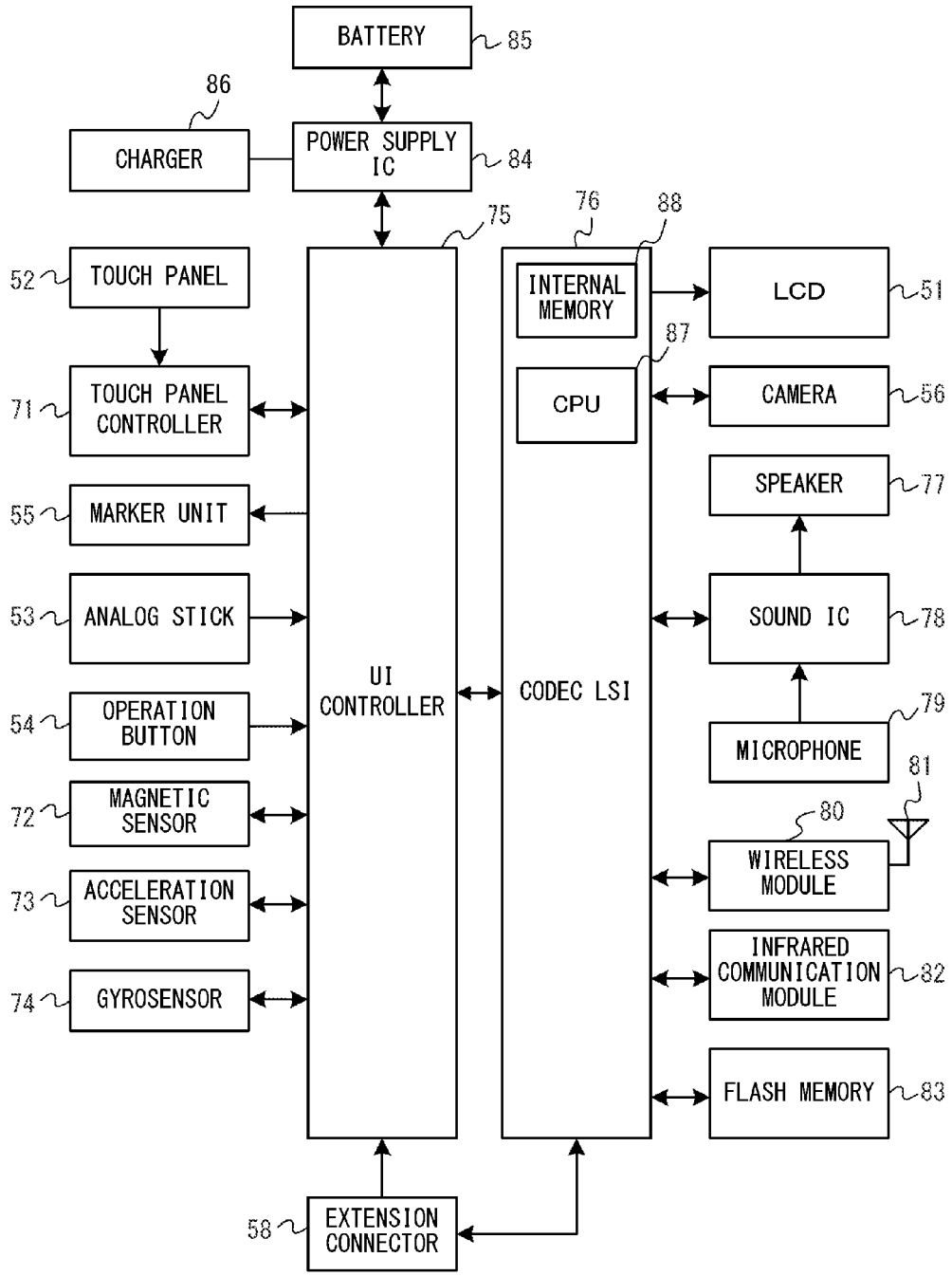
FIG. 12 is a block diagram showing an example internal configuration of the terminal device.

Next, an internal configuration of the terminal device 7 will be described with reference to FIG. 12. FIG. 12 is a block diagram showing an internal configuration of the terminal device 7. As shown in FIG. 12, in addition to the configuration shown in FIG. 9, the terminal device 7 includes a touch panel controller 71, a magnetic sensor 72, the acceleration sensor 73, the gyrosensor 74, a user interface controller (UI controller) 75, a codec LSI 76, the speaker 77, a sound IC 78, the microphone 79, a wireless module 80, an antenna 81, an infrared communication module 82, a flash memory 83, a power supply IC 84, and a battery 85. These electronic components are mounted on an electronic circuit board and accommodated in the housing 50.

The UI controller 75 is a circuit for controlling the input/output of data to/from various types of input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, and the gyrosensor 74. The UI controller 75 is connected to the codec LSI 76 and the extension connector 58. The power supply IC 84 is connected to the UI controller 75, and power is supplied to various sections via the UI controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function. That is, although not shown in the drawings, a cradle with which power can be obtained from an external power supply can be connected to the power supply IC 84 via the charging terminal 66, and the terminal device 7 can receive power supply from or be charged by an external power supply using the cradle.

The touch panel controller 71 is a circuit connected to the touch panel 52 for controlling the touch panel 52. The touch panel controller 71 generates touch position data of a predetermined format based on signals from the touch panel 52, and outputs it to the UI controller 75. The touch position data represents, for example, the coordinates of a position on the input surface of the touch panel 52 at which an input is made. The touch panel controller 71 reads a signal from the touch panel 52 and generates touch position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects the azimuthal direction by sensing the size and direction of the magnetic field. Azimuthal direction data representing the detected azimuthal direction is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 9(a)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyrosensor 74 is provided inside the housing 50 for detecting angular velocities about the three axes, i.e., the x-axis, the y-axis and the z-axis. Angular velocity data representing the detected angular velocities is outputted to the UI controller 75. Control instructions for a gyrosensor 74 are outputted from the UI controller 75 to the gyrosensor 74. The number and combination of gyrosensors used for detecting angular velocities about three axes may be any number and combination, and the gyrosensor 74 may be formed by a 2-axis gyrosensor and a 1-axis gyrosensor, as is the gyrosensor 48. The gyrosensor 74 may be a gyrosensor for 1-axis or 2-axis detection.

The UI controller 75 outputs, to the codec LSI 76, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 76 is a circuit for performing a compression process on data to be transmitted to the game device 3, and an expansion process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not itself perform game processes, the terminal device 7 may execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speaker 77 and the microphone 79 for controlling input/output of sound data to/from the speaker 77 and the microphone 79. That is, when sound data is received from the codec LSI 76, the sound IC 78 outputs sound signals obtained by performing D/A conversion on the sound data to the speaker 77 so that sound is outputted from the speaker 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The codec LSI 76 transmits, as terminal operation data, image data from the camera 56, sound data from the microphone 79 and operation data from the UI controller 75 to the game device 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 82 establishes infrared communication in conformity with the IRDA standard, for example, with the other device. The codec LSI 76 may transmit, to the game device 3, data received via infrared communication while it is included in the transmit data as necessary.

As described above, compressed image data and sound data are transmitted from the game device 3 to the terminal device 7. These data are received by the codec LSI 76 via the antenna 81 and the wireless module 80. The codec LSI 76 expands the received image data and sound data. The expanded image data is outputted to the LCD 51, and images are displayed on the LCD 51. That is, the codec LSI 76 (the CPU 87) displays the received image data on the display section. The expanded sound data is outputted to the sound IC 78, and the sound IC 78 outputs sounds from the speaker 77.

In a case in which control data is included in data received from the game device 3, the codec LSI 76 and the UI controller 75 give control instructions to various sections in accordance with the control data. As described above, the control data is data representing control instructions for the components of the terminal device 7 (the camera 56, the touch panel controller 71, the marker section 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyrosensor 74 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Outline of Game Processes]

Figure 13:
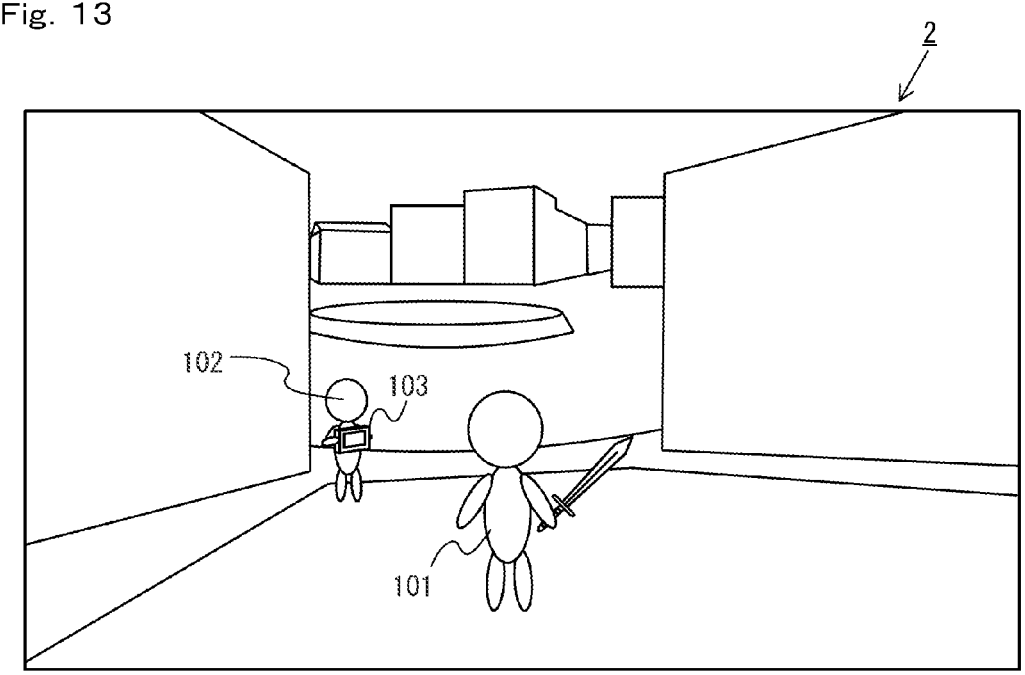
FIG. 13 is a diagram showing an example game image (television image) displayed on a television 2.
Figure 14:
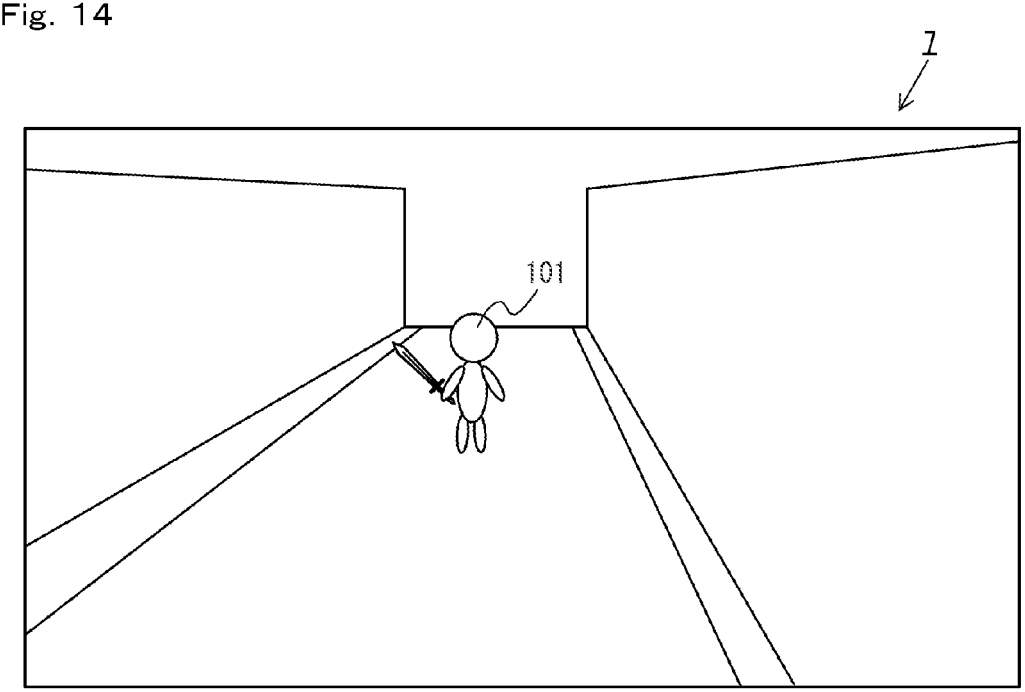
FIG. 14 is a diagram showing an example game image (terminal image) displayed on a terminal device 7.

An outline of game processes to be performed in the game system 1 of the present embodiment will now be explained with reference to FIGS. 13 and 14. In the present embodiment, two players perform game operations. One is a player who plays a predetermined game provided by a game program (referred to as the "game player"). The other is a player who performs operations of capturing an image of a desired area of the game space of the predetermined game and saving the game images ("camera player"). That is, in the present embodiment, one player plays the game, while the other player takes the role of capturing (saving) game images of the game being played by the first player. In other embodiments, there may be a plurality of game players who play a predetermined game, and there may be a plurality of camera players who capture images of the game space. That is, the game system 1 may include a plurality of controllers 5, and may include a plurality of terminal devices 7.

While controller devices used by players may be any controller devices, the game player performs game operations using the controller 5 and the camera player performs game operations using the terminal device 7 in the present embodiment. While players use different types of controller devices in the present embodiment, players may use the same type of controller devices in other embodiments. For example, where the game system 1 includes two terminal devices 7, each player may perform game operation using a terminal device 7 of the player.

In the present embodiment, a game image representing a three-dimensional virtual space (game space) is displayed on two display devices, i.e., the television 2 and the terminal device 7 (the LCD 51). First, an outline of game processes related to the television image will be explained. FIG. 13 is a diagram showing an example game image (television image) displayed on the television 2. As shown in FIG. 13, an image representing an area in the game space including a player character 101 is displayed on the television 2. The player character 101 is an object operated by the game player. The game device 3 obtains the controller operation data from the controller 5 (and the terminal operation data from the terminal device 7). The game device 3 performs game processes based on the controller operation data. The game processes are those that allow the game to progress in accordance with operations by the game player, and include the process of controlling the action of the player character 101, for example. Hereinafter, such game processes may be referred to as the "main game processes", as opposed to game processes that are performed in accordance with operations by the camera player to be described below. The game to be played based on the main game processes may be any type of a game.

The game device 3 sets a television virtual camera in the game space. The television virtual camera is a virtual camera used for generating the television image. In the present embodiment, the television virtual camera is set so as to generate game images for the game player. Specifically, as shown in FIG. 13, the position (the viewpoint position) and the attitude (the viewing direction) of the television virtual camera are set so that the player character 101 is included in the viewing field range (the image-capturing range). While the image of a camera character 102 is also included in the television image in FIG. 13, the television virtual camera is controlled independently of the camera character 102 in the present embodiment.

Moreover, the game device 3 generates, as the television image, a game image representing the game space as viewed from the television virtual camera. Then, the game image is outputted to the television 2, which is a display device separate from the terminal device 7. Thus, an image representing the game space including the player character 101 is displayed on the television 2. The game player plays the game by performing game operations while looking at the game image displayed on the television 2. The process of performing the main game process in accordance with the operation by the game player to display the television image may be of any type of a game, and the contents and the type of the game to be played by the game player are not limited to any particular contents and type in the present embodiment.

Next, an outline of game processes related to the terminal image will be explained. FIG. 14 is a diagram showing an example game image (terminal image) displayed on the terminal device 7. As shown in FIG. 14, a game image representing the game space as viewed from the camera character 102 (more specifically, a camera object 103 of the camera character 102) is displayed on the terminal device 7. The camera character 102 is an object operated by the camera player described above. Herein, since the camera object 103 is facing toward the player character 101 as shown in FIG. 13, an image including the player character 101 as shown in FIG. 14 is displayed as the terminal image.

The game device 3 sets a terminal virtual camera based on the terminal operation data. The terminal virtual camera is a virtual camera used for generating the terminal image. The terminal virtual camera is a virtual camera, different from the television virtual camera, that is arranged in the same game space as the television virtual camera. The terminal virtual camera may be set in any manner as long as it is set in accordance with operations performed on the terminal device 7 (the terminal operation data). In the present embodiment, the camera character 102 is controlled so as to move in the game space based on the terminal operation data, and the terminal virtual camera is set based on the position and the direction of the camera character 102. In the present embodiment, in the presence of the camera character 102, which is a photographer who moves in the game space and captures images, the camera player can easily grasp the movement of the terminal virtual camera. In the present embodiment, the attitude of the terminal virtual camera (and the camera object 103) changes in accordance with the attitude of the terminal device 7, details of which will be described later. Thus, the camera player can change the direction of the terminal virtual camera by an intuitive and easy operation.

The game device 3 generates, as the terminal image, a game image representing the game space as viewed from the terminal virtual camera. Then, the game image is outputted to the terminal device 7. The terminal device 7 receives the output game image, and displays the game image on the display unit (the LCD 51). Thus, a game image representing the game space as viewed from the terminal virtual camera is displayed on the terminal device 7. The camera player can change the position and the direction of the terminal virtual camera by operating the terminal device 7, and game images of the game space as viewed from various viewpoints and viewing directions can be displayed on the terminal device 7.

In response to an execution of a predetermined image-capturing operation on the terminal device 7, the game device 3 stores (saves) image information regarding the terminal image in a predetermined storage device. While the predetermined image-capturing operation may be any operation to be performed on the terminal device 7, it is the operation of pressing the second R button 54L in the present embodiment. The image information may be any information as long as the terminal image can be generated and displayed based on the image information. That is, the image information may be the terminal image itself (the image data of the terminal image) or information (e.g., game parameters such as positions, directions, etc., of various objects and the terminal virtual camera) such that the terminal image can be generated using the image information and the game program. The predetermined storage device may be any storage device that is accessible from the game device 3, and the image information is stored, for example, in the main memory of the game device 3 or in the flash memory 17.

As described above, in the present embodiment, the terminal virtual camera is set in the game space of the game played by the game player. Then, by operating the terminal virtual camera, the camera player can display an image of the game space as viewed from a desired viewpoint and viewing direction on the terminal device 7, and save the image by an image-capturing operation. Thus, the camera player can capture images in the game space from a freer range of viewpoints, without being limited to the viewpoint (or the viewing direction) of the (game player) image displayed on the television 2. Since the image to be captured is displayed on the terminal device 7, which is the controller device, the camera player can easily check the image to be captured on the controller device at hand.

In the present embodiment, the game device 3 performs the game process of controlling the action of the player character 101 based on the controller operation data. Then, if the player character 101 is included in the viewing field range of the terminal virtual camera, the game device 3 generates the terminal image including the image of the player character 101 (FIG. 14). However, the camera player can also capture an image of the player character 101, which is the object controlled by the game player, from a viewpoint different from the viewpoint of the game image displayed on the television 2.

[6. Details of Game Processes]

Figure 15:
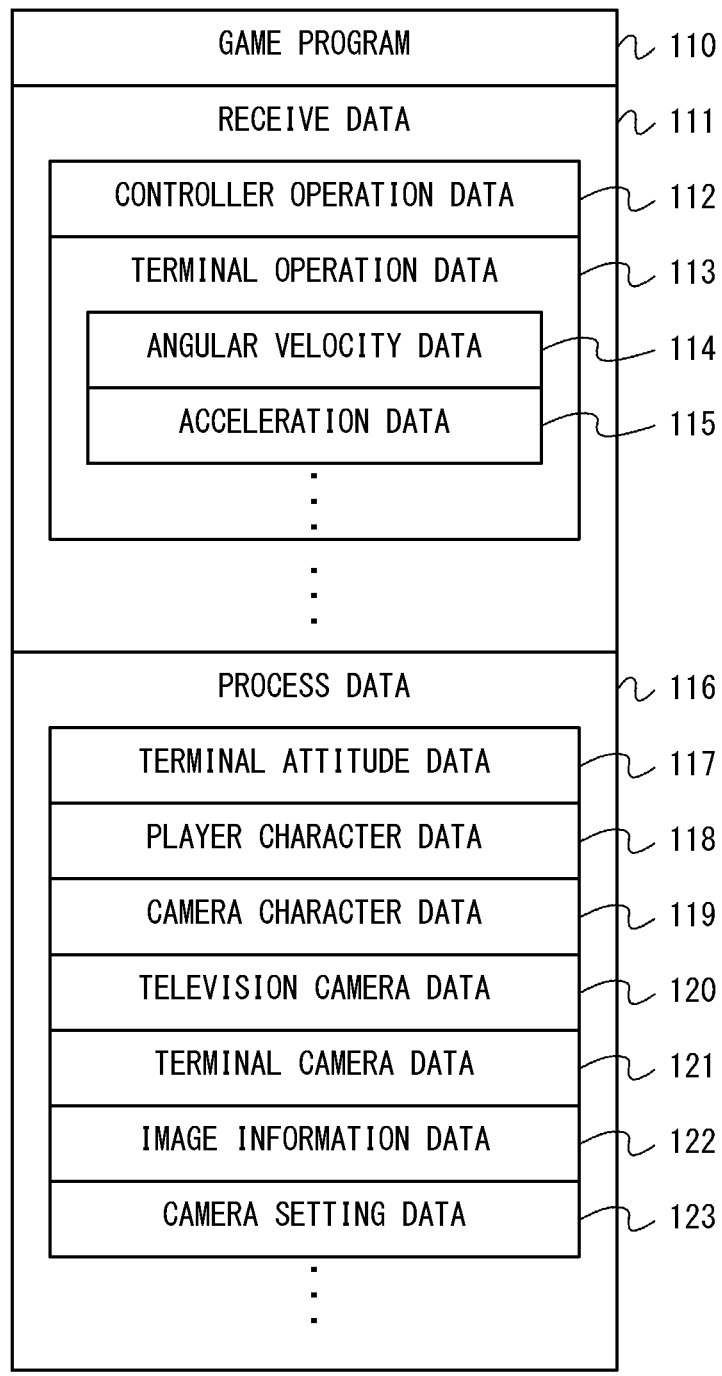
FIG. 15 is a diagram showing various data used in game processes.

Next, the details of game processes performed by the present game system will be described. First, various data used in the game process will be described. FIG. 15 is a diagram showing various data used in the game processes. FIG. 15 shows primary data to be stored in the main memory (the external main memory 12 or the internal main memory 11e) of the game device 3. As shown in FIG. 15, the main memory of the game device 3 stores a game program 110, receive data 111, and process data 116. In addition to those shown in FIG. 15, the main memory also stores other data used in the game, such as image data of various objects appearing in the game, and sound data used in the game, etc.

At an appropriate point in time after the power of the game device 3 is turned ON, a part or whole of the game program 110 is loaded from the optical disc 4 and stored in the main memory. The game program 110 may be obtained from the flash memory 17 or an external device of the game device 3 (e.g., via the Internet), instead of from the optical disc 4. A part of the game program 110 (e.g., a program for calculating the attitude of the controller 5 and/or the terminal device 7) may be pre-stored in the game device 3.

The receive data 111 are various data received from the controller 5 and the terminal device 7. The receive data 111 includes controller operation data 112 and terminal operation data 113. If a plurality of controllers 5 are connected, the controller operation data 112 is stored for each of the controllers 5. If a plurality of terminal devices 7 are connected, the terminal operation data 113 (this similarly applies to camera image data and microphone sound data to be described below) is stored for each of the terminal devices 7.

The controller operation data 112 is data representing an operation performed on the controller 5 by the user (player), and is output (transmitted) from the controller 5 based on an operation performed on the controller 5. The controller operation data 112 is transmitted from the controller 5, and obtained by the game device 3 to be stored in the main memory. The game device 3 is capable of communicating with a plurality of controllers, and obtaining operation data from each of the controllers. Where there are a plurality of controllers, the controller operation data transmitted from the controllers are separately stored in the main memory. The main memory may store a predetermined number of latest (most recently obtained) sets of the controller operation data for each controller.

In the present embodiment, as data obtained from the main controller 8, the controller operation data 112 includes main operation button data, main acceleration data, angular velocity data, and marker coordinate data. The main operation button data 8 is data representing the input state of each of the operation buttons 32a to 32i provided on the main controller 8. Specifically, the main operation button data represents whether each of the operation buttons 32a to 32i is being pressed. The main acceleration data is data representing the acceleration (acceleration vector) detected by the acceleration sensor 37 of the main controller 8. While the main acceleration data herein represents three-dimensional acceleration of which each component is the acceleration for one of the three axes of X, Y and Z shown in FIG. 3, it may represent acceleration for any one or more directions in other embodiments. The angular velocity data is data representing the angular velocity detected by the gyrosensor 48 of the main controller 8. While the angular velocity data represents angular velocity about each of the three axes of X, Y and Z shown in FIG. 3, it may represent angular velocity about anyone or more axes in other embodiments. The marker coordinate data is data representing coordinates calculated by the image processing circuit 41 of the image-capturing/processing unit 35, i.e., the marker coordinates. The marker coordinates are represented in a two-dimensional coordinate system for representing a position on a plane corresponding to the captured image, and the marker coordinate data represents the coordinate values in the two-dimensional coordinate system.

In the present embodiment, as data obtained from the sub-controller 9 (via the main controller 8), the controller operation data 112 includes sub-stick data, sub-operation button data, and sub-acceleration data. The sub-stick data is data representing an operation performed on the analog joy stick 91 of the sub-controller 9. Specifically, the sub-stick data represents the direction and the amount of tilt of the analog joy stick 91. The sub-operation button data is data representing the input state of each of the operation buttons provided on the sub-controller 9. Specifically, the sub-operation button data represents whether each of the operation buttons is being pressed. The sub-acceleration data is data representing the acceleration (acceleration vector) detected by the acceleration sensor 93 of the sub-controller 9. While the sub-acceleration data herein represents three-dimensional acceleration of which each component is the acceleration for one of the three axes of x', y' and z' shown in FIG. 7, it may represent acceleration for any one or more directions in other embodiments.

As long as the controller operation data 112 represents the operation performed by the player on the controller 5, it may include only some of the various data included in the controller operation data 112 in the present embodiment. In a case in which the controller 5 includes another input unit (e.g., a touch panel, an analog stick, or the like), the controller operation data 112 may include data representing the operation performed on the other input unit. In a case in which the attitude of the controller 5 itself is used as the game operation, the controller operation data 112 includes data whose value varies in accordance with the attitude of the controller 5 itself, such as the main acceleration data, the angular velocity data, the marker coordinate data or the sub-acceleration data.

The terminal operation data 113 is data representing an operation performed by a player on the terminal device 7. The terminal operation data 113 is transmitted from the terminal device 7 and obtained by the game device 3 to be stored in the main memory. The game device 3 is capable of communicating with a plurality of terminal devices, and obtaining operation data from each of the terminal devices. Where there are a plurality of terminal devices, the terminal operation data transmitted from the terminal devices are separately stored in the main memory. The main memory may store a predetermined number of latest (most recently obtained) sets of terminal operation data, for each terminal device.

As shown in FIG. 15, the terminal operation data 113 includes angular velocity data 114 and acceleration data 115. The second angular velocity data 114 is data representing the angular velocity detected by the gyrosensor 74. While the angular velocity data 114 represents angular velocity about each of the three axes of x, y and z shown in FIG. 9 in the present embodiment, it may represent angular velocity about any one or more axes in other embodiments. The second acceleration data 115 is data representing the acceleration (acceleration vector) detected by the acceleration sensor 73. While the acceleration data 115 represents three-dimensional acceleration of which each component is the acceleration for one of the three axes of x, y and z shown in FIG. 9, it may represent acceleration for any one or more directions in other embodiments. The gyrosensor 74 and the acceleration sensor 73 are example inertia sensors. The game device 3 can calculate the attitude of the terminal device 7 based on the detection results of the inertia sensors (the angular velocity data 114 and the acceleration data 115).

The terminal operation data 113 includes operation button data, stick data, touch position data, and azimuthal direction data. The second operation button data 7 is data representing the input status of the operation buttons 54A to 54L provided on the terminal device 7. Specifically, the operation button data represents whether each of the operation buttons 54A to 54L is being pressed. The stick data is data representing the direction and the amount of slide (or tilt) of the stick portion of the analog stick 53 (the analog sticks 53A and 53B). The direction and the amount may be represented as two-dimensional coordinates or a two-dimensional vector, for example. The touch position data is data representing the position (touch position) on the input surface of the touch panel 52 at which an input is made. In the present embodiment, the touch position data represents coordinate values in a two-dimensional coordinate system for representing a position on the input surface. In a case in which the touch panel 52 is of a multi-touch type, the touch position data may represent a plurality of touch positions. The azimuthal direction data is data representing the azimuthal direction detected by the magnetic sensor 72. In the present embodiment, the azimuthal direction data represents the direction of a predetermined azimuthal direction (e.g., north) with respect to the terminal device 7. In a place where there is a magnetic field other than the geomagnetic field, the azimuthal direction data does not strictly represent the absolute azimuthal direction (e.g., north). Nevertheless, a relative direction of the terminal device 7 with respect to the direction of the magnetic field in that place is represented by the azimuthal direction data, and it is therefore possible to calculate, based on the azimuthal direction data, the attitude or the change in attitude of the terminal device 7 even in such cases.

The terminal operation data 113 may be data representing operations performed on the terminal device 7, and may be data including only one of the various data described above included in the terminal operation data 113 in the present embodiment. In a case in which the terminal device 7 includes other input units (e.g., a touch pad, an image-capturing unit of the controller 5, etc.), the terminal operation data 113 may include data representing operations performed on the other input units. In a case in which the movement of the terminal device 7 itself is used as a game operation as in the present embodiment, the terminal operation data 113 includes data regarding the movement of the terminal device 7 (data whose value changes in accordance with the movement), such as the second acceleration data 101, the second angular velocity data 102 or the azimuthal direction data 103. The information regarding the movement of the terminal device 7 is information such as, for example, the position, the attitude, the change in position (velocity), the change in attitude (angular velocity), the acceleration, the angular acceleration, etc., of the terminal device 7.

The receive data 111 includes camera image data and microphone sound data, in addition to the various operation data. The camera image data is data representing an image captured by the camera 56 of the terminal device 7 (the captured image). The camera image data is image data obtained by the codec LSI 27 expanding the compressed image data transmitted from the terminal device 7, and the data is stored in the main memory by the input/output processor 11a. The microphone sound data is data representing sounds (microphone sounds) detected by the microphone 79 of the terminal device 7. The microphone sound data is sound data obtained by the codec LSI 27 expanding the compressed sound data transmitted from the terminal device 7, and the data is stored in the main memory by the input/output processor 11a.

Figure 16:
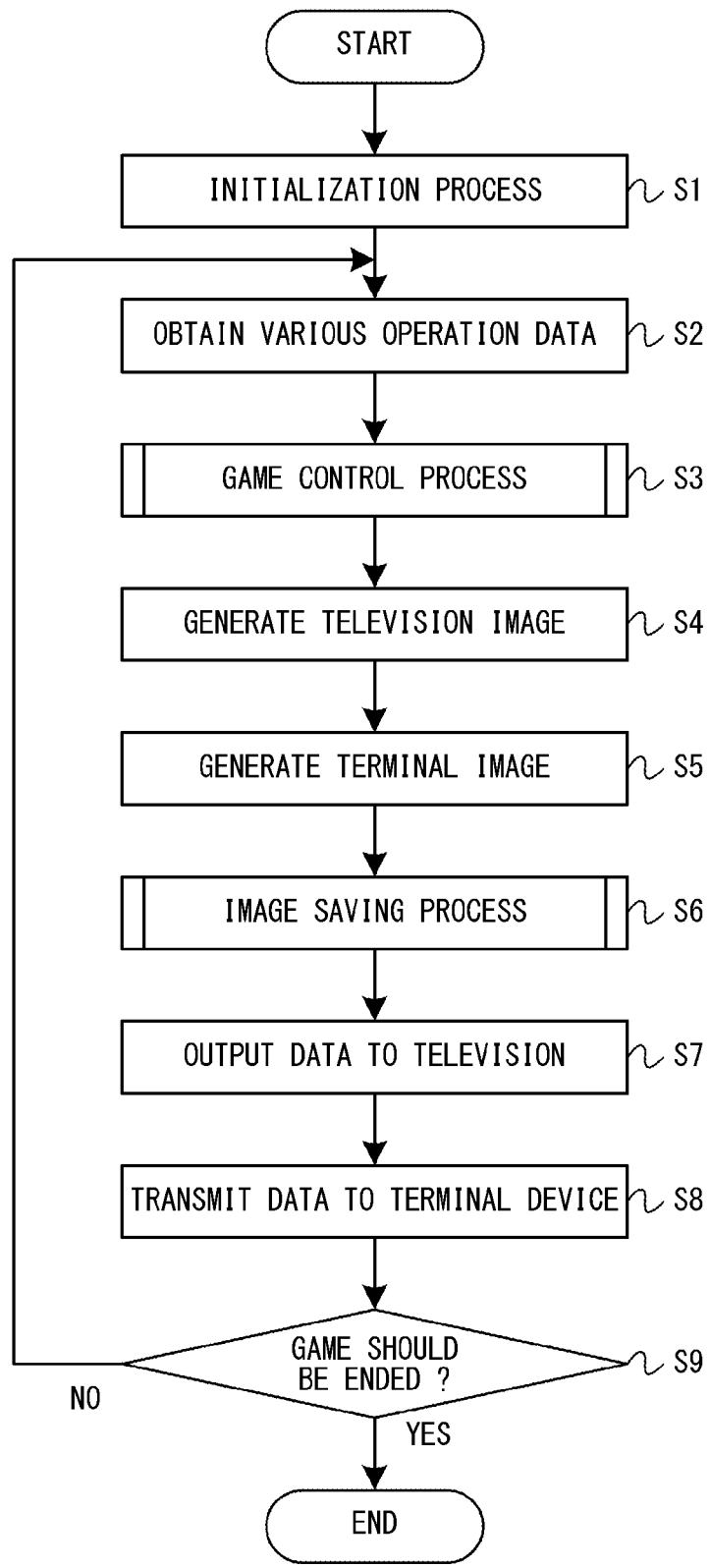
FIG. 16 is a main flow chart showing an example flow of game processes performed by a game device 3.

The process data 116 is data used in game processes to be described below (FIG. 16). The process data 116 includes terminal attitude data 117, player character data 118, camera character data 119, television camera data 120, terminal camera data 121, image information data 122, and camera setting data 123. In addition to the data shown in FIG. 15, the process data 116 includes various data used in game processes such as data representing various parameters set for various objects appearing in the game.

The terminal attitude data 117 is data representing the attitude of the terminal device 7. For example, the attitude of the terminal device 7 may be expressed by a rotation matrix that represents the rotation from a predetermined reference attitude to the current attitude of the terminal device 7, or may be expressed by a third-order vector or three angles. While the attitude in the three-dimensional space is used as the attitude of the terminal device 7 in the present embodiment, the attitude in the two-dimensional plane may be used in other embodiments. In the present embodiment, the terminal attitude data 117 is calculated based on the angular velocity data 114 and the acceleration data 115 included in the terminal operation data 113 described above. The method for calculating the terminal attitude data 117 will be described below in step S21.

The player character data 118 represents various information that are set for the player character 101. Herein, the player character data 118 represents the position and the direction, etc., of the player character 101. In the present embodiment, the position and the direction of the player character 101 are calculated based on the controller operation data 112.

The camera character data 119 represents various information that are set for the camera character 102. Herein, the camera character data 119 represents the position and the direction of the camera character 102. In the present embodiment, the position and the direction of the camera character 102 are calculated based on the terminal operation data 113 (more specifically, the stick data included in the terminal operation data 113).

The television camera data 120 represents the position and the attitude of the television virtual camera set in the game space. In the present embodiment, the television virtual camera is set based on the position and the direction of the player character 101.

The terminal camera data 121 represents the position and the attitude of the terminal virtual camera set in the game space. In the present embodiment, the terminal virtual camera is set based on the terminal operation data 113 (the camera character data 119).

The image information data 122 is data that represents the image information described above. In the present embodiment, the image information data 122 is image data of the terminal image itself. Therefore, in the present embodiment, captured (saved) game images can be displayed even on an information processing device that is in no environment for executing the game program 110.

The camera setting data 123 is data representing various setting information regarding the image-capturing operation by the camera object 103. The setting information are various camera-related parameters such as, for example, the zoom, the shutter speed, the focal length and the lens type. The image process performed on a terminal image to be saved may be changed in accordance with the setting information. That is, the camera setting data 123 can be said to be data representing the contents of the image process performed on the terminal image to be saved, or can be said to be data representing the setting regarding how the terminal image is saved. In the present embodiment, the camera setting data 123 is set based on an instruction from the camera player, i.e., the terminal operation data 113.

Next, the details of game processes performed by the game device 3 will be described with reference to FIGS. 16 to 20. FIG. 16 is a main flow chart showing the flow of game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The flow chart shown in FIG. 16 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed in response to the player making a selection on the menu screen, for example, so as to start the game.

Figure 17:
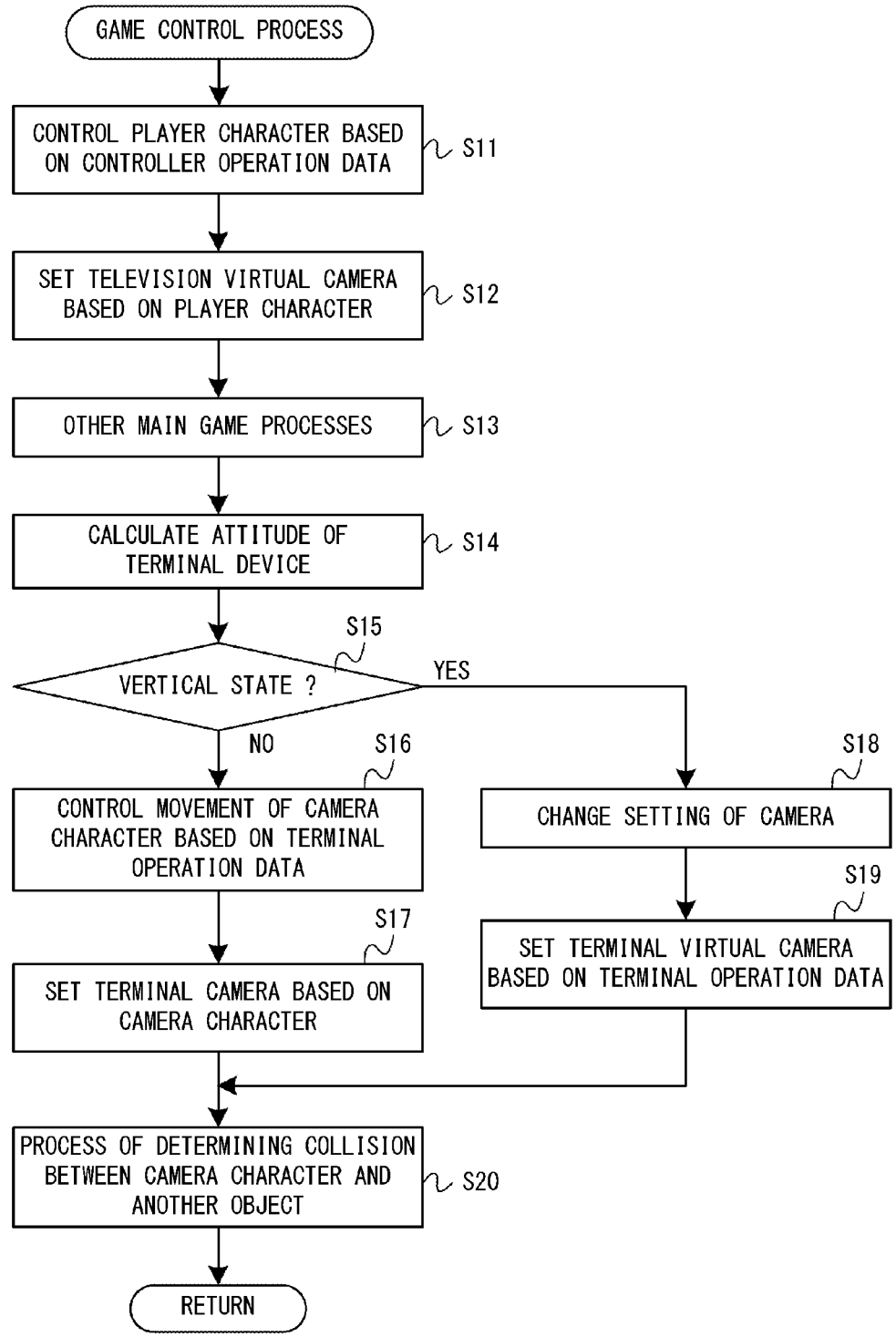
FIG. 17 is a flow chart showing an example detailed flow of a game control process (step S3) shown in FIG. 16.
Figures 18, 19:
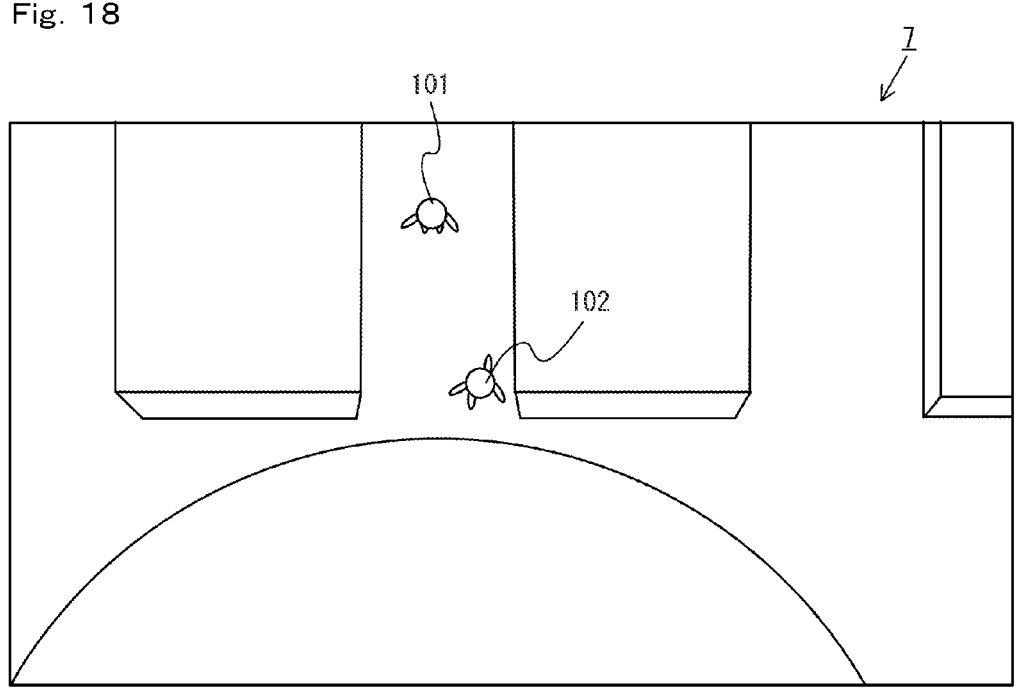
FIG. 18 is a diagram showing an example terminal image to be displayed when the terminal device 7 is in a horizontal state.
FIG. 19 is a chart showing an example relationship between the attitude of the terminal device 7 and the attitude of the terminal virtual camera.

The processes of the steps of the flow chart shown in FIGS. 16 to 18 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a game space, placing objects appearing in the game space at their initial positions, and setting initial values of various parameters used in the game processes. In the present embodiment, the player character 101 and the camera character 102 are each arranged in the game space at a predetermined position and in a predetermined direction. Data representing the position and the direction of the player character 101 is stored in the main memory as the player character data 118. Data representing the position and the direction of the camera character 102 is stored in the main memory as the camera character data 119. The television virtual camera and the terminal virtual camera are set at predetermined initial positions in predetermined initial attitudes. The television virtual camera is set at a predetermined position and in a predetermined attitude such that the player character 101 is included in the viewing field range. The terminal virtual camera is set at a predetermined position and in a predetermined attitude such that the camera character 102 is included in the viewing field range. Data representing the initial position and the initial attitude of the television virtual camera is stored in the main memory as the television camera data 120, and data representing the initial position and the initial attitude of the terminal virtual camera is stored in the main memory as the terminal camera data 121. Data representing predetermined setting information is stored in the main memory as the camera setting data 123. The process of step S2 is performed, following step S1. Thereafter, the process loop including a series of processes of steps S2 to S9 is repeatedly performed at a rate of once per a predetermined amount of time (a one frame period, e.g., 1/60 sec).

In step S2, the CPU 10 obtains various operation data (the controller operation data and the terminal operation data). That is, since the controller 5 repeatedly transmits the controller operation data to the game device 3, the controller communication module 19 in the game device 3 successively receives the controller operation data, and the input/output processor 11a successively stores the received controller operation data in the main memory. The transmission/reception interval between the controller 5 and the game device 3 may be shorter than the game process time, and is 1/200 sec, for example. In step S2, the CPU 10 reads out the latest controller operation data 112 from the main memory. The CPU 10 obtains the terminal operation data transmitted from the terminal device 7. As the terminal device 7 repeatedly transmits the terminal operation data to the game device 3, the game device 3 successively receives the terminal operation data. In the game device 3, the terminal communication module 28 successively receives the terminal operation data, and the input/output processor 11a successively stores the terminal operation data in the main memory. In step S2, the CPU 10 reads out the latest (most recently received) terminal operation data 113 from the main memory. The process of step S3 is performed, following step S2.

In step S3, the CPU 10 performs the game control process. The game control process allows the game to progress by, for example, the process of controlling an object based on operations by the player. The details of the game control process will now be described with reference to FIG. 17.

FIG. 17 is a flow chart showing a detailed flow of the game control process (step S3) shown in FIG. 16. In the game control process, first, in steps S11 to S13, the main game process which allows the game for the game player to progress is performed.

In step S11, the CPU 10 controls the action of the player character 101 based on the controller operation data. While the player character 101 may be controlled in any manner as long as it is controlled based on the controller operation data 112, the movement of the player character 101 in the game space is controlled in the present embodiment. Specifically, the CPU 10 moves the player character 101 in accordance with direction inputs made on a direction input device (the cross button 32a or the analog joy stick 91). In addition to controlling the movement of the player character 101, the CPU 10 may perform, for example, a control for executing a predetermined action (e.g., an attack action, etc.) in response to an operation performed on a predetermined button (the A button 32d, etc.). The CPU 10 calculates data representing the state (the position and the direction) of the player character 101 based on the controller operation data 112 read out in step S2. Then, data representing the calculated state is stored in the main memory as new player character data 118. The process of step S12 is performed, following step S11.

In step S12, the CPU 10 sets the television virtual camera based on the position and/or the direction of the player character 101. The specific method for setting the television virtual camera may be any method. In the present embodiment, the television virtual camera is set so that the player character 101 is included in the game image generated by the television virtual camera. Specifically, the television virtual camera is set at a predetermined position that is behind the player character 101 and slightly above the player character 101, and in an attitude facing toward the player character 101 (see FIG. 13). In other embodiments, the television virtual camera may be set at the position of the player character 101. As a specific process of step S12, the CPU 10 reads out the player character data 118 from the main memory, and calculates the position and the attitude of the television virtual camera based on the position and the direction of the player character 101. Then, data representing the calculated position and attitude is stored in the main memory as the television camera data 120. The process of step S13 is performed, following step S12.

In step S13, the CPU 10 performs other main game processes. The other main game processes refer to those processes that are performed as main game processes other than those of steps S11 to S12 described above. The other main game processes include, for example, the process of controlling the action of an enemy character appearing in the game space, and the process of determining collision between different objects. Other than these, in step S13, processes for allowing the game to progress are performed as necessary. The process of step S14 is performed, following step S13.

If the action of an object (e.g., an enemy character) is controlled in step S13 described above, the CPU 10 may control the object based on the camera character 102 (taking into consideration the camera character 102). For example, the CPU 10 may cause an enemy character to launch an attack against the camera character 102. Then, the camera player captures images while taking into consideration actions of other objects, rather than simply moving the camera character 102 around and capturing images, and it is therefore possible to provide a game with a high quality of gameplay. The CPU 10 may control the object independently of the camera character 102 (irrespective of the camera character 102). Also in such a case, by determining collision between the camera character 102 and other objects, it is possible to provide a game with high playability. For example, in a game in which the player character 101 and an enemy character shoot and battle against each other, the camera player captures desired game images while making sure that the camera character 102 is not hit by stray bullets. Then, it is possible to realize a game that provides high playability also for the camera player while the camera character 102 does not hinder the game of the player character 101.

In steps S14 to S20, the process of allowing the game to progress in response to operations performed by the camera player (the camera game process) is performed. In step S14, the CPU 10 calculates the attitude of the terminal device 7. In the present embodiment, the attitude of the terminal device 7 is calculated based on a physical quantity for calculating an attitude, which is represented by the terminal operation data. In the present embodiment, the angular velocity represented by the angular velocity data 114 and the acceleration represented by the acceleration data 115 are used as physical quantities for calculating an attitude. The details of the attitude calculation process will be described below.

In the attitude calculation process, first, the CPU 10 calculates the attitude of the terminal device 7 based on the angular velocity data 114. While the method for calculating the attitude based on the angular velocity may be any method, the attitude is calculated using the previous attitude (the attitude calculated in step S14 in a previous iteration of the process loop) and the current angular velocity (the angular velocity obtained in step S2 in a current iteration of the process loop). Specifically, the CPU 10 calculates the attitude by rotating the previous attitude by a unit time's worth of the current angular velocity. The previous first attitude is represented by the terminal attitude data 117 stored in the main memory, and the current angular velocity is represented by the angular velocity data 114 stored in the main memory. Therefore, the CPU 10 reads out the terminal attitude data 117 and the angular velocity data 114 from the main memory to calculate the attitude of the terminal device 7. The data representing the attitude calculated as described above is stored in main memory.

Where the attitude is calculated from the angular velocity, it is preferred that an initial attitude is set. That is, where the attitude of the terminal device 7 is calculated from the angular velocity, the CPU 10 initially sets the initial attitude of the terminal device 7. The initial attitude of the terminal device 7 may be calculated based on the acceleration data 115, or the player may be prompted to perform a predetermined operation with the terminal device 7 in a particular attitude so that the particular attitude at the point in time when the predetermined operation is performed is set as the initial attitude. While the initial attitude may be calculated in a case in which the attitude of the terminal device 7 is calculated as an absolute attitude with respect to a predetermined direction in the space, the initial attitude may not be calculated in a case in which the attitude of the terminal device 7 is calculated as a relative attitude with respect to the attitude of the terminal device 7 at the start of the game, for example.

Once the attitude is calculated based on the angular velocity, the CPU 10 then adjusts the calculated attitude based on the acceleration of the terminal device 7. In a state in which the terminal device 7 is substantially stationary, the acceleration acting upon the terminal device 7 means the gravitational acceleration. That is, in this state, the acceleration vector represented by the acceleration data 115 represents the direction of gravity in the terminal device 7. Therefore, the CPU 10 makes an adjustment such that the downward direction (the direction of gravity) of the attitude calculated based on the angular velocity is brought closer to the direction of gravity represented by the acceleration vector. That is, the attitude is rotated so that the downward direction is brought closer to the direction of gravity represented by the acceleration vector at a predetermined rate. Thus, the attitude based on the angular velocity can be adjusted to an attitude based on the acceleration with the direction of gravity taken into consideration. The predetermined rate may be a predetermined fixed value or may be set in accordance with the detected acceleration, etc. For example, the CPU 10 may increase the rate at which the downward direction of the attitude is brought closer to the direction of gravity represented by the acceleration vector when the magnitude of the detected acceleration is close to the magnitude of the gravitational acceleration, and decrease the rate when the magnitude of the detected acceleration is remote from the magnitude of the gravitational acceleration.

Specifically, the CPU 10 reads out data representing the attitude calculated based on the angular velocity and the acceleration data 115 from the main memory, and makes the adjustment described above. Then, data representing the attitude after the adjustment is made is stored in the main memory as the terminal attitude data 117. The process of step S15 is performed, following step S14.

In the present embodiment, the CPU 10 calculates the attitude of the terminal device 7 based on the detection results of the inertia sensors (the acceleration sensor 73 and the gyrosensor 74). In other embodiments, the method for calculating the attitude of the terminal device 7 may be any method. For example, in other embodiments, where the terminal device 7 includes other sensor units (e.g., the magnetic sensor 72 and the camera 56), the attitude of the controller 5 may be calculated using the detection results of the other sensor units. That is, the CPU 10 can know a predetermined azimuthal direction with respect to the terminal device 7 (i.e., the attitude of the terminal device 7 with respect to a predetermined azimuthal direction), from the azimuthal direction data detected by the magnetic sensor 72. Therefore, in other embodiments, the CPU 10 may calculate the attitude of the terminal device 7 by further using the azimuthal direction data, in addition to the angular velocity data 114 and the acceleration data 115. In a case in which the attitude of the terminal device 7 is calculated using the azimuthal direction data, it is possible to calculate the absolute attitude with respect to a predetermined direction in the real space, and it is therefore possible to more accurately calculate the attitude of the terminal device 7. Regarding the azimuthal direction data, in a place where there is a magnetic field other than the geomagnetic field, the azimuthal direction data does not strictly represent the absolute azimuthal direction (e.g., north). Nevertheless, since it represents the relative direction of the terminal device 7 with respect to the direction of the magnetic field in that place, it is still possible to calculate the attitude of the terminal device 7. In other embodiments, the attitude may be calculated based on one or two of the three data described above. For example, in a case in which the game system 1 includes a camera for capturing an image of the terminal device 7, the game device 3 may obtain the image-capturing results of capturing an image of the terminal device 7 with that camera, and calculate the attitude of the terminal device 7 using the image-capturing results.

In step S15, the CPU 10 determines whether the terminal device 7 is in the vertical state. The vertical state herein refers to a state in which the attitude of the screen of the terminal device 7 (the LCD 51) is closer to being vertical than a predetermined reference. A state in which the attitude of the screen of the terminal device 7 (the LCD 51) is closer to being horizontal than the predetermined reference is referred to as the "horizontal state". The determination process of step S15 is a process for determining whether the terminal device 7 is in the vertical state or in the horizontal state.

As long as whether the terminal device 7 is in the vertical state can be determined, the determination method of step S15 may be any method. The CPU 10 may obtain data with which the attitude of the terminal device 7 can be calculated (estimated), and make the above determination based on this data. In the present embodiment, the CPU 10 reads out the terminal attitude data 117 from the main memory, and makes the determination of step S15 based on the attitude of the terminal device 7. The CPU 10 can calculate a vector representing a direction perpendicular to the screen of the LCD 51 from the attitude of the terminal device 7, and can make the above determination based on the direction of the vector or the magnitude of the vertical component of the vector. In other embodiments, the determination of step S15 can be made using the acceleration data 115, for example, as data with which the attitude of the terminal device 7 can be calculated (estimated). For example, the CPU 10 can make the above determination based on the magnitude of one of the components of the vector represented by the acceleration data 115 that is perpendicular to the screen of the terminal device 7.

If the determination result of step S15 is affirmative (i.e., if the terminal device 7 is in the vertical state), the process of step S18 to be described below is performed. On the other hand, if the determination result of step S15 is negative (i.e., if the terminal device 7 is in the horizontal state), the process of step S16 is performed.

In step S16, the CPU 10 controls the movement of the camera character 102 based on the terminal operation data 113. The movement of the camera character 102 may be controlled in any manner as long as it is controlled based on the terminal operation data 113. In the present embodiment, the CPU 10 moves the camera character 102 in accordance with direction inputs made on a direction input device (e.g., the left analog stick 53a) of the terminal device 7. For example, the camera character 102 may move forward or backward in response to a direction input in the up-down direction, and swivel (or translate) left or right in response a direction input in the left-right direction. The CPU 10 may control a predetermined action in response to an operation performed on a predetermined button, for example, in addition to the movement of the camera character 102. As a specific process of step S16, the CPU 10 calculates data representing the position and the direction of the camera character 102 based on the terminal operation data 113 read out in step S2. Then, data representing the calculated state is stored in the main memory as the camera character data 119. The process of step S17 is performed, following step S16.

In other embodiments, an area of the game space across which the camera character 102 is allowed to move may be predefined. That is, the CPU 10 may control the movement of the camera character 102 within the predefined area (across which the camera character 102 is allowed to move). An area that is different from (with or without some overlap with) the area across which the player character 101 is allowed to move may be predefined as the area across which the camera character 102 is allowed to move. A predetermined area including the player character 101 (specifically, an area within a predetermined range centered about the player character 101) may be predefined as an area across which the camera character 102 is not allowed to move. Thus, by predefining an area across which the camera character 102 is allowed to move, thereby limiting the range across which the camera character 102 is allowed to move, it is possible to ensure that the camera character 102 does not hinder the player character 101.

In step S17, the CPU 10 sets a terminal virtual camera based on the position of the camera character 102. The specific method for setting the terminal virtual camera may be any method. In the present embodiment, the CPU 10 sets the terminal virtual camera so as to generate an image representing the game space including the camera character 102. That is, the terminal virtual camera is set so that the camera character 102 is included in the viewing field range. The terminal image is a game image in so-called "third-person perspective". Specifically, the terminal virtual camera is set at a position above (or right above) the camera character 102 in such an attitude that the terminal virtual camera faces toward the camera character 102. FIG. 18 is a diagram showing an example terminal image to be displayed in a case in which the terminal device 7 is in the horizontal state. In the present embodiment, as shown in FIG. 18, the terminal virtual camera is set so that a map-like image is generated representing the game space from a viewpoint above the camera character 102. Thus, in a case in which the terminal device 7 is in the horizontal state, an image is generated that is suitable for an operation by the camera player to move the camera character 102. In other embodiments, the terminal virtual camera may be set at a position behind (or behind and slightly above) the camera character 102 in such an attitude that the terminal virtual camera faces toward the camera character 102. Then, as in the present embodiment, the camera character 102 is included in the viewing field range of the terminal virtual camera. As a specific process of step S17, the CPU 10 reads out the camera character data 119 from the main memory, and calculates the position and the attitude of the terminal virtual camera based on the position and the direction of the camera character 102. Then, data representing the calculated position and attitude is stored in the main memory as the terminal camera data 121. The process of step S20 to be described later is performed, following step S17.

In the present embodiment, when the terminal device 7 is in the horizontal state, a terminal image representing the game space including the camera character 102 is generated as in the process of step S17 described above. Thus, by holding the terminal device 7 in the horizontal state, it is easier for the camera player to move the camera character 102.

On the other hand, in step S18, the CPU 10 changes the camera-related setting information (the zoom, the shutter speed, etc.). The change of the setting information is made when a predetermined condition is satisfied, and is not made otherwise (no process is performed, and step S18 is skipped). While the predetermined condition may be any condition, it is, in the present embodiment, the camera player giving a predetermined change instruction. Specifically, for example, if a direction input in the up-down direction is made on the right analog stick 35b of the terminal device 7, the CPU 10 changes the zoom value as setting information. In other embodiments, the predetermined condition may be a condition related to the progress of the game (e.g., the camera character 102 obtaining a predetermined item), or a condition related to a predetermined object (e.g., an object to be image-captured enters the viewing field range of the terminal virtual camera, etc.). If the setting information is changed in step S18, the CPU 10 stores data representing the setting information having been changed in the main memory as the camera setting data 123. The process of step S19 is performed, following step S18.

In step S19, the CPU 10 sets the terminal virtual camera based on the terminal operation data 113. While the terminal virtual camera may be set by any method, the CPU 10 sets the attitude of the terminal virtual camera based on the attitude of the terminal device 7 in the present embodiment. The position of the terminal virtual camera is determined based on the position of the camera character 102. That is, the terminal virtual camera is set at a position that is determined by the camera character 102, and in an attitude determined in accordance with the attitude of the terminal device 7. The method for setting the terminal virtual camera will now be described with reference to FIG. 19.

FIG. 19 is a diagram showing the relationship between the attitude of the terminal device 7 and the attitude of the terminal virtual camera. The left column of the table shown in FIG. 19 shows the state at the point in time when the terminal device 7 is brought into the vertical state (this will be referred to as the reference state). As shown in FIG. 19, in the present embodiment, a terminal virtual camera 104 is set at the position of the camera object 103. The position of the camera object 103 is determined based on the position of the camera character 102. At the point in time when the reference state is achieved, the terminal virtual camera 104 is set so as to face the front direction of the camera character 102 with respect to the yaw direction (the rotation direction about an axis extending in the vertical direction). With respect to the roll direction and the pitch direction, the terminal virtual camera 104 is set to be in an attitude in accordance with the attitude of the terminal device 7.

The right column of the table shown in FIG. 19 shows another state achieved by rotating the terminal device 7 to the right from the reference state. Then, the terminal virtual camera 104 is in an attitude obtained by turning the viewing direction to the right from the attitude in the reference state by the same amount as the amount of rotation of the terminal device 7 (see the lower section of the right column of the table shown in FIG. 19). That is, after the attitude in the reference state is set, the terminal virtual camera 104 is rotated, from the attitude in the reference state, in a direction in accordance with the direction of change of the attitude of the terminal device 7 and by an amount in accordance with the amount of change thereof. The attitude of the terminal virtual camera 104 is set so that the viewing direction of the terminal virtual camera 104 corresponds to an axis perpendicular to the screen of the LCD 51 (the y axis shown in FIG. 8). Thus, in the present embodiment, the attitude of the terminal virtual camera in the virtual game space is controlled so as to correspond to the attitude of the terminal device 7 in the real space. In the present embodiment, when the attitude of the terminal device 7 changes from the reference state, the position of the terminal virtual camera 104 also changes slightly, in addition to the attitude thereof (see the lower section of the right column of the table shown in FIG. 19). Specifically, the terminal virtual camera 104 rotates about a predetermined position of the camera character 102 as the center in accordance with the attitude of the terminal device 7.

In step S19, when the attitude of the terminal virtual camera 104 changes from the reference state, the CPU 10 changes the position and the attitude of the camera object 103 in accordance with the position and the attitude of the terminal virtual camera 104 (so as to match the terminal virtual camera 104). The CPU 10 changes the posture of the camera character 102 in accordance with the position and the attitude of the camera object 103. Therefore, when the camera character 102 and the camera object 103 are displayed on the television 2, the game player can know, in greater details, the position and the attitude of the terminal virtual camera, from the camera character 102 and the camera object 103 displayed. Therefore, it is easier to perform game operations for cases where the game player cooperates with the image-capturing (game image-saving) operation by the camera character 102, e.g., where the camera character 102 is made to capture an image of the player character 101 from a desired angle, for example.

As a specific process of step S19, the CPU 10 reads out the terminal attitude data 117 and the camera character data 119 from the main memory, and calculates the attitude of the camera object 103 and the attitude of the terminal virtual camera based on the attitude of the terminal device 7. The position of the camera object 103 and the position of the terminal virtual camera are calculated based on the position of the camera character 102 and the attitude of the terminal device 7. The calculated position and attitude of the terminal virtual camera are stored in the main memory as the terminal camera data 121. The process of step S20 is performed, following step S19.

As described above, in the present embodiment, the CPU 10 sets a terminal virtual camera so that the camera character 102 is included in the viewing field range when the attitude of the screen of the LCD 51 is closer to being horizontal than a predetermined reference (No in step S15), and sets the terminal virtual camera at a position which is the viewpoint of the camera character 102 when the attitude of the screen of the LCD 51 is closer to being vertical than the predetermined reference (Yes in step S15). Then, when the terminal device 7 is in the horizontal state, a game image suitable for operations of moving the camera character 102 is displayed, whereas when the terminal device 7 is in the vertical state, a game image suitable for image-capturing operations is displayed. Therefore, with the present embodiment, the camera player can hold the terminal device 7 in a horizontal position when moving the camera character 102 (terminal virtual camera) so that the camera player can perform operations without getting the arms tired. As the camera player holds the terminal device 7 in a vertical position when performing an image-capturing operation, the camera player can operate the terminal device 7 as if it were an actual camera. Therefore, it is possible to improve the controllability in movement operations and image-capturing operations using the camera character 102 (terminal virtual camera). The camera player can easily switch between the two different operations.

In the present embodiment, the CPU 10 calculates the attitude of the terminal device 7 (step S14), and sets the attitude of the terminal virtual camera based on the attitude of the terminal device 7 (step S19). Therefore, the player can change the image-capturing direction by changing the direction of the terminal virtual camera in accordance with the attitude of the terminal device 7, and thus can change the image-capturing direction by an intuitive and easy operation.

In the present embodiment, the position of the camera character 102 is calculated (step S17) based on data (stick data) representing a direction input on the direction input device of the terminal device 7, and the position of the terminal virtual camera is set (step S19) based on the position of the camera character 102. That is, the CPU 10 sets the position of the terminal virtual camera based on the data described above. Therefore, with the present embodiment, the camera player can easily move the terminal virtual camera using the direction input device. While the camera character 102 cannot be moved when the terminal device 7 is in the vertical state in the present embodiment, the CPU 10 may control the movement of the camera character 102 based on the terminal operation data even when the terminal device 7 is in the vertical state in other embodiments. In such a case, the method for controlling the camera character 102 may be the same as, or different from, that when the terminal device 7 is in the horizontal state. For example, since game images in so-called "first-person perspective" are displayed in the vertical state, the CPU 10 may use a control method such that the speed of movement of the camera character 102 is lower than that in the horizontal state.

In step S20, the CPU 10 performs a process of determining collision between the camera character 102 and another predetermined object. That is, the CPU 10 controls the camera character 102 based on whether a predetermined object and the camera character 102 have collided with each other. Specifically, the CPU 10 reads out the camera character data 119 and the process data used for the determination from the main memory, and determines whether the camera character 102 and another predetermined object collide with each other. If it is determined that they collide with each other, a post-collision process is performed. Herein, the predetermined object may be any object whose action is controlled by the main game process described above, and may be, for example, an object of the player character 101, an object of an enemy character, or objects of items used by these characters (e.g., objects of bullets that are shot by these characters). The post-collision process may be any process, e.g., a process of causing the camera character 102 to execute a predetermined action (e.g., an action of falling down following the collision), or a process of changing game parameters (e.g., reducing the hit points) of the camera character 102. When a post-collision process is performed, the CPU 10 stores data resulting from the process in the main memory. The CPU 10 ends the game control process after step S20.

As in the process of step S20 described above, the camera character 102 may be influenced by the game played by the game player. For example, the camera character 102 may collide with the player character 101 or an enemy character, or may be hit by a bullet of a gun. Thus, it is possible to improve the quality of gameplay of the game in which the camera character 102 is controlled to capture images, and to provide a game with high playability. The camera character 102 will influence the game played by the game player. Therefore, also in the game in which the player character 101 is controlled, the player plays the game while taking into consideration the action of the camera character 102, thus realizing a game with high quality in terms of the strategic aspect and the playability. With the present embodiment, it is possible to realize a game in which players cooperate with each other, e.g., a game in which the player character 101 tries to make it easier for the camera character 102 to capture images. It is also possible to realize a game in which players battle against each other, such as a game in which the camera character 102 tries to capture images while running around so as not to be shot by the player character 101.

In other embodiments, the game may be a game in which the camera character 102 is not influenced by the game played by the game player (the camera character 102 does not influence the game played by the game player). That is, the CPU 10 may control the camera character 102, independently of whether a predetermined object whose action is controlled by the main game process and the camera character 102 collide with each other. That is, the CPU 10 may not perform the process of step S20 described above. For example, in a case of a shooting game (war game) in which the player character 101 and an enemy character shoot each other with guns and cannons, the game device 3 may not perform, for the camera character 102, the process of determining the collision of the player character 101 or the enemy character with bullets of a gun. Then, the game player can play the game without being hindered by the camera character 102. The camera player also can control the camera character 102 without being hindered by the game played by the game player. Since the camera character 102 can freely move in the game space without being influenced by the game played by the game player, it is easier to perform an operation of capturing (saving) a game image from a desired position. Even when the CPU 10 does not determine collisions with the predetermined objects, the CPU 10 may determine collisions with terrain objects such as the ground, walls and buildings.

With the game control process described above, the main game process is performed in accordance with operations performed by the game player (steps S11 to S13) while the camera game process is performed in accordance with operations performed by the camera player (steps S14 to S20). Herein, the camera game process may be performed independently of the main game process. For example, the camera game process does not need to start (or end) when the main game process is started, and the camera game process may be started (or ended) in response to an instruction from the camera player while the main game process is performed. The camera game process may be performed while the main game process is paused whereby the player character 101 and other objects are standing still. As is the camera game process, the main game process may also be started or ended in response to an instruction from the game player while the camera game process is played, or may be performed also while the camera game process is paused whereby the camera character 102 is standing still.

Referring back to FIG. 16, the process of step S4 is performed, following the game control process of step S3. In step S4, the television image is generated. That is, the CPU 10 and the GPU 11b read out data representing the results of the game control process of step S3 (e.g., data regarding the virtual camera and various characters arranged in the game space) from the main memory, and also read out data used for generating a game image from the VRAM 11d, to generate a television image. In the present embodiment, the television virtual camera is set at a position such that the player character 101 is included in the viewing field range. Thus, a television image representing an area in the virtual space including the player character 101 is generated. The generated television image is stored in the VRAM 11d. The process of step S5 is performed, following step S4.

In the present embodiment, in step S4 described above, the CPU 10 generates the television image including an image of the camera character 102 if the camera character 102 is included in the viewing field range of the television virtual camera. That is, in such a case, the CPU 10 renders the camera character 102 in a manner similar to that for other objects. Therefore, in such a case, the camera character 102 is displayed on the television 2 (see FIG. 13). Then, since the game player who plays the game while looking at the television 2 can visually check the camera character 102, it is possible to easily grasp the position of the terminal virtual camera in the game. Then, the game player can cooperate with the camera player so that a desired image is saved by the camera player, e.g., by assisting the camera character 102 to capture an image of the player character 101 from a desired angle. Thus, with the present embodiment, since the game player can play the game taking into consideration the image-capturing operation by the camera character 102, it is possible to provide a game with high quality in terms of the game play and the playability.

In other embodiments, the camera character 102 may be displayed semitransparent on the television 2. That is, when the television image is generated in step S4, the camera character 102 may be rendered so as to appear semitransparent. Then, the game device 3 can display the camera character 102 on the television 2 without being conspicuous on the display.

In other embodiments, the camera character 102 may not be displayed on the television 2. That is, the camera character 102 may not be rendered in the television image generation process (step S4). Specifically, even if the camera character 102 is included in the viewing field range of the television virtual camera, the CPU 10 may generate the television image without rendering the camera character 102 (i.e., while treating the camera character 102 as being transparent). Then, since the camera character 102 is not displayed on the television 2 and has no influence on the game of the game player in terms of display, the game player can play the game without being hindered by the camera character 102.

In step S5, the terminal image is generated based on the game control process described above. That is, the CPU 10 and the GPU 11b read out data representing the results of the game control process of step S3 from the main memory, and also read out data used for generating a game image from the VRAM 11d, to generate a terminal image. In the present embodiment, the terminal virtual camera is set at the position of the camera character 102 (more specifically, the position of the camera object 103). Thus, a terminal image representing the game space as viewed from the position of the camera character 102 (the camera object 103) is generated. The generated terminal image is stored in the VRAM 11d. The process of step S6 is performed, following step S5.

When the terminal image is generated in step S5 described above, a predetermined image process may be performed on the terminal image based on the setting information for the camera which is set in step S18 described above. For example, the CPU 10 and the GPU 11b may perform a process of enlarging or shrinking the terminal image in accordance with the zoom value (or changing the viewing angle of the terminal virtual camera), or a process of blurring the image of the object in accordance with the focal length. This enhances the level of reality in capturing (saving) a game image using the terminal device 7, and the camera player can feel as if the camera player were performing the image-capturing operation using an actual camera.

In step S6, the CPU 10 performs an image saving process. The image saving process is a process of storing (saving) image information regarding the terminal game image in response to an image-capturing operation performed on the terminal device 7. The details of the image saving process will now be described with reference to FIG. 20.

Figure 20:
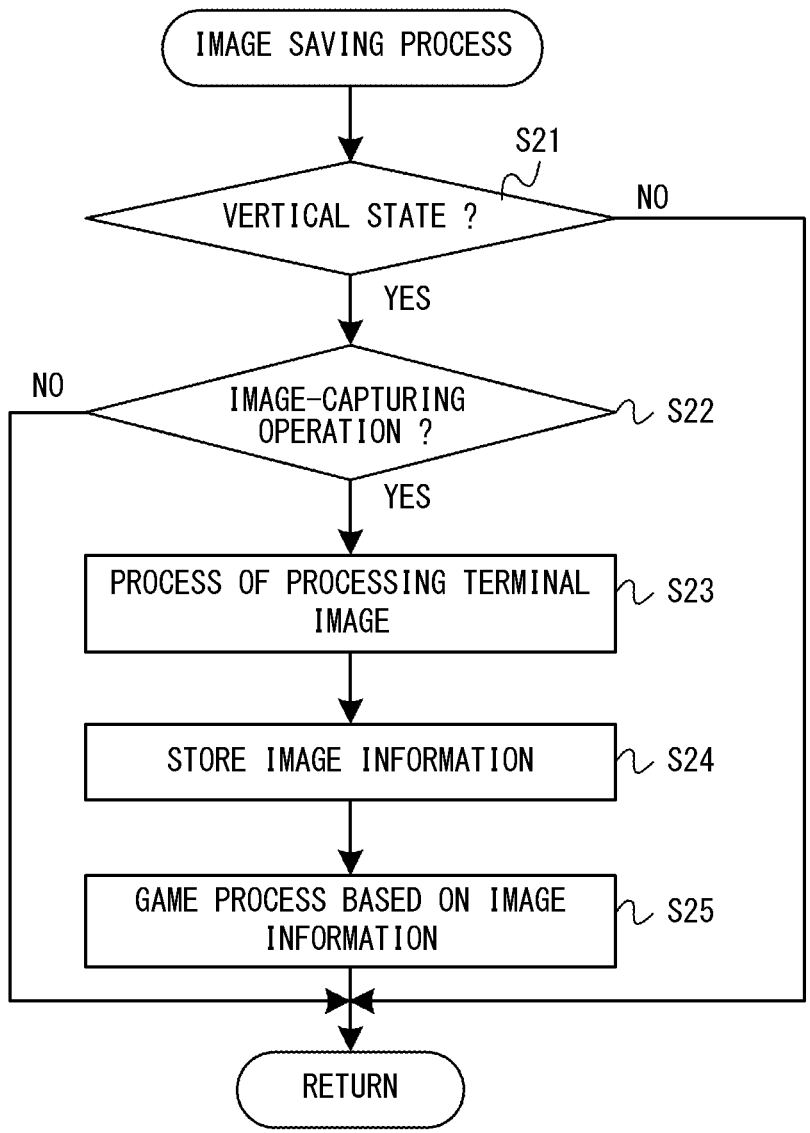
FIG. 20 is a flow chart showing an example detailed flow of an image saving process (step S6) shown in FIG. 16.

FIG. 20 is a flow chart showing a detailed flow of an image saving process (step S6) shown in FIG. 16. In the image saving process, first, in step S21, the CPU 10 determines whether the terminal device 7 is in the vertical state. The process of step S21 is the same as the process of step S15 described above. If the determination result of step S21 is affirmative (i.e., if the terminal device 7 is in the vertical state), the process of step S22 to be described below is performed. On the other hand, if the determination result of step S21 is negative (i.e., if the terminal device 7 is in the horizontal state), the CPU 10 ends the image saving process.

In step S22, the CPU 10 determines whether a predetermined image-capturing operation has been performed on the terminal device 7. The image-capturing operation is an operation performed for storing (saving) a terminal image, and is an operation of pressing a predetermined button (herein, the second R button 54L) of the terminal device 7, for example. Specifically, the CPU 10 determines whether the predetermined button has been pressed by referencing operation button data included in the terminal operation data 113 obtained in step S2. If the determination result of step S22 is affirmative, the process of step S23 is performed. On the other hand, if the determination result of step S22 is negative, the CPU 10 ends the image saving process.

In step S23, the CPU 10 performs an image process for the terminal image. The image process is performed as necessary based on the setting information for the camera, for example. For example, where the shutter speed is set as the setting information, the CPU 10 (and the GPU 11b) may change the brightness of the terminal image in accordance with the shutter speed value. For example, where the focal length is set as the setting information, the CPU 10 (and the GPU 11b) may change the degree by which the terminal image is blurred or switch the object to be in focus from one to another in accordance with the focal length value. The image process is performed as necessary, and may not be performed depending on the value of the setting information. The image process performed when generating the terminal image in step S5 described above does not need to be performed again in step S23. In other embodiments, the image process may be performed based on how the image-capturing operation is performed. For example, the CPU 10 (and the GPU 11b) may change the brightness of the terminal image in accordance with the length of time over which the predetermined button is pressed so that the brightness of the image is changed in accordance with the length of time over which the shutter is open. For example, the CPU 10 (and the GPU 11b) may process the terminal image so as to blur the terminal image in accordance with the movement of the terminal device 7 (e.g., the acceleration data 115) while the image-capturing operation is being performed so that the camera shake during the image-capturing operation is reflected in the saved image. Then, it is possible to improve the level of reality of the image-capturing operation, and the camera player can more vividly sense the feel as if the camera player were capturing images with an actual camera.

The terminal image to be processed in the image process of step S23 described above (in other words, the terminal image to be saved) is a terminal image that is displayed on the terminal device 7 at a predetermined point in time determined based on the point in time at which the image-capturing operation is performed. The terminal image to be processed in the image process may be an image that is displayed on the terminal device 7 at the point in time at which the image-capturing operation is performed, or an image that is displayed before or after that point in time. In the present embodiment, the terminal image is a terminal image that is generated at the point in time at which the image-capturing operation is performed, i.e., a terminal image that is generated in the process of step S5 immediately before the point in time. In other embodiments, the predetermined point in time may be determined in any other manner. For example, in a case in which the image process is performed so as to blur the terminal image, the CPU 10 (and the GPU 11b) may generate a blurred image based on a plurality of terminal images that are generated while the predetermined button is pressed. The process of step S24 is performed, following step S23.

In step S24, the CPU 10 stores image information regarding the terminal image to be saved. The image information may be any information as long as the terminal image can be generated and displayed based on the image information. In the present embodiment, the CPU 10 stores the image data itself as the image information. That is, the CPU 10 stores, in the main memory, image data of the terminal image generated in step S5, or image data obtained by performing an image process of step S23 on the image data. While the image information is stored in the main memory herein, the storage device for storing the image information may be any storage device accessible by the game device 3. For example, in other embodiments, the image information may be stored in the flash memory 17, or may be stored in an external device capable of communicating with the game device 3. The process of step S25 is performed, following step S24.

As described above, with the present embodiment, since the image data itself is stored as the image information, the image data can be displayed even on other information processing devices that do not (are not able to) execute the game program 110. On the other hand, in other embodiments, the game device 3 may store information such that the terminal image can be generated using the image information and the game program. Then, it is possible to reduce the amount of data to be stored as the image information. In a case in which such information is stored, the saving process of step S24 may be performed before the terminal image is generated.

The image process of step S23 and the saving process of step S24 described above do not have to be performed on the entire area of the terminal image, but may be performed on a predetermined portion of the terminal image. That is, an image process may be performed on a predetermined portion of the terminal image, and the image information regarding the processed image may be saved. The predetermined portion (area) may be predefined, may be determined by the camera player, or may be determined in accordance with the setting information for the camera (the camera setting data 123) or the game status.

In step S25, the CPU 10 performs a game process based on the stored image information. The game process may be any process as long as it produces some game-related effect in accordance with the image information stored in step S24. For example, the game process may be a process of adding to the score when an object which is the predetermined image-capturing target is included within the image represented by the image information. Then, the camera player is allowed to play a game of trying to spot, and capture an image of, an object which is an image-capturing target, thereby further improving the quality of gameplay. Thus, by producing game effects in accordance with the contents of an image saved by an image-capturing process, it is possible to improve the quality of gameplay for the camera player performing image-capturing operations, thus providing a game with higher playability. Data obtained as a result of the game process described above is stored in the main memory. The CPU 10 ends the image saving process after step S25 described above.

With the image saving process described above, image information regarding a terminal image is stored (saved) in response to a predetermined image-capturing operation performed on the terminal device 7. Thus, the camera player can save a desirable terminal image by an operation using the terminal device 7.

In the embodiment above, the CPU 10 can store the image information only when the terminal device 7 is in the vertical state. Then, it is possible to prevent undesired image information being stored by an erroneous operation when the terminal device 7 is in the horizontal state. In other embodiments, the CPU 10 may allow image information to be stored also in the horizontal state as well as in the vertical state.

Referring back to FIG. 16, in step S7 following step S6, the CPU 10 outputs the television image to the television 2. Specifically, the CPU 10 sends data of the television image stored in the VRAM 11*d* to the AV-IC 15. In response to this, the AV-IC 15 outputs the data of the television image to the television 2 via the AV connector 16. Thus, the television image is displayed on the television 2. In step S7, game sound data may also be outputted to the television 2, together with the game image data, so as to output the game sound from the speaker 2*a* of the television 2. The process of step S8 is performed, following step S7.

In step S8, the CPU 10 outputs (transmits) the terminal image to the terminal device 7. Specifically, the image data of the terminal image stored in the VRAM 11*d* is sent to the codec LSI 27 by the CPU 10, and is subjected to a predetermined compression process by the codec LSI 27. The compressed image data is transmitted by the terminal communication module 28 to the terminal device 7 via the antenna 29. The terminal device 7 receives, by means of the wireless module 80, the image data transmitted from the game device 3, and a predetermined expansion process is performed by the codec LSI 76 on the received image data. The expanded image data is outputted to the LCD 51. Thus, the terminal image is displayed on the LCD 51. In step S8, the game sound data may also be transmitted to the terminal device 7, together with the game image data, so as to output the game sound from the speaker 77 of the terminal device 7. The process of step S9 is performed, following step S8.

In step S9, the CPU 10 determines whether the game should be ended. The determination of step S9 is made based on, for example, whether either player has given an instruction to quit the game. If the determination result of step S9 is negative, the process of step S2 is performed again. If the determination result of step S9 is affirmative, the CPU 10 ends the game process shown in FIG. 16. When ending the game process, the CPU 10 may perform a process of, for example, saving game data in a memory card, or the like. Thereafter, the series of processes through steps S2 to S9 is repeatedly performed until it is determined in step S9 that the game should be ended.

With the game process described above, the camera player can operate the terminal virtual camera in the game space in which the game player plays the game. Therefore, it is possible to capture (save) an image of the game space from a freer range of viewpoints or viewing directions as compared with conventional techniques.

There is no limitation on the image saved in the game process above as long as it can be viewed in one way or another. For example, the saved image may be allowed to be viewed on a menu screen in the game executed by the game program 110, or on a menu screen that is displayed following power-up of the game device 3. Saved images may be allowed to be viewed by a predetermined image viewer application. Moreover, saved images may be transferred to another information processing device, different from the game device 3, and allowed to be viewed on that information processing device. In a case in which image information is saved such that an image can be generated therefrom using the game program, the image can be allowed to be viewed on an information processing device that is capable of executing the game program. That is, in such a case, the information processing device generates an image based on the game program and the image information, and displays the generated image on a display device.

[7. Variations]

(Variation Regarding Contents of Game)

In the embodiment above, the game played by using the terminal device 7 is a game whose primary objective is to capture game images, as opposed to the game played by using the controller 5 (even though the games use the same game space). Herein, there is no limitation on the contents and the objective of the game played by using the terminal device 7. For example, in other embodiments, the game played by using the terminal device 7 and the game played by using the controller 5 may share the same objective. For example, in a game in which two players cooperate with each other (or play against each other), the game device 3 may allow game images to be saved by using the terminal device 7 when a camera character controlled by the terminal device 7 satisfies a predetermined game condition (e.g., to obtain a camera item, etc.).

(Variation Regarding Form of Image to be Saved)

While the embodiment above is directed to an example in which still images are saved, images (image information) to be saved may be of a motion video. That is, the game device 3 may store image information of a plurality of terminal images of a motion video. For example, the CPU 10 may start saving image information in response to an execution of an image-capturing operation, and end saving image information in response to an execution of an image-capturing-ending operation. More specifically, the CPU 10 may repeatedly perform, frame by frame, the process of step S23 (and S22) described above since the execution of the image-capturing operation until the execution of the image-capturing-ending operation.

In other embodiments, the game device 3 may save image information of a stereoscopic image (3D image) to be displayed on a stereoscopic display device capable of stereoscopic display. The stereoscopic image may be generated by the following method, for example. That is, in response to an execution of the image-capturing operation, the CPU 10 sets a virtual camera at each of two positions that are at a predetermined distance left and right of the position of the terminal virtual camera. Then, images of the game space as viewed from the two virtual cameras set are generated, and image information regarding the two generated two images is saved. Thus, it is possible to generate a stereoscopic image and save image information of the stereoscopic image.

(Variation Regarding Configuration of Game System)

In the embodiment above, the game system 1 has a configuration including the game device 3, the terminal device 7 having a display unit (the LCD 51), the controller 5, and the television 2. Herein, there is no limitation on the game system as long as the game system includes a game device and at least two controller devices, wherein images can be displayed on the display unit of at least one of the controller devices and on a predetermined display device. For example, the game system may be provided in such a form that a predetermined display device (the television 2) is not included. For example, the game system may be provided in a form in which a display device similar to the terminal device 7 is included as a predetermined display device. That is, the game system may have a configuration including two controller devices having a display unit, and a game device.

(Variation Regarding Controller Device Having Display Unit)

While the terminal device 7 is used as a controller device having a display unit in the embodiment above, the controller device is not limited to this. For example, the game system may have a configuration including a portable game device having a display unit, instead of the terminal device 7. In other embodiments, the game system may have a configuration including two portable game devices used as controller devices, and a game device.

(Variation Regarding Information Processing Device Performing Game Process)

While a series of game processes of the game system 1 is performed by the game device 3 in the embodiment above, some of the game processes may be performed by another device. For example, in other embodiments, some of the game processes (e.g., the terminal image generation process) may be performed by the terminal device 7. In other embodiments, in an input system that includes a plurality of information processing devices that can communicate with each other, the game processes may be divided among the plurality of information processing devices. That is, a game system may include a first controller device and a second controller device, wherein the game device includes: (a) a game process unit for performing game processes based on first operation data representing operations performed on the first controller device; (b) a first camera setting unit for setting a first virtual camera in a game space; (c) a first image generation unit for generating a first game image, which is a game image representing the game space as viewed from the first virtual camera and is a game image to be displayed on a predetermined display device separate from the second controller device; (d) a second camera setting unit for setting, based on second operation data representing operations performed on the second controller device, a second virtual camera which is arranged in the game space and is different from the first virtual camera; (e) a second image generation unit for generating a second game image, which is a game image representing the game space as viewed from the second virtual camera and is a game image to be displayed on a display unit of the second controller device; and (f) an image information storage unit for storing image information regarding the second game image in a predetermined storage device in response to an execution of a predetermined operation on the second controller device. The units (a) to (f) may be provided in a single device or in a plurality of devices.

Where game processes are performed by a plurality of information processing devices, the game processes will be complicated because game processes to be performed by different information processing devices are synchronized together. In contrast, where game processes are performed by a single game device 3, wherein the terminal device 7 is responsible for the process of receiving and displaying game images, as in the embodiment above (i.e., where the terminal device 7 serves as a thin client terminal), there is no need to synchronize the game processes between a plurality of information processing devices, and it is therefore possible to simplify the game processes.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. A processing system including at least one CPU when executing instructions in accordance this logic may operate as "programmed logic circuitry" to perform the operations defined by the logic.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment is applicable, for example, to game systems, game devices, game programs, etc., with the aim of, for example, saving game images of a game space as viewed from a free range of viewpoints and viewing directions.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising a game device, a first controller device, and a second controller device, wherein:
the game device comprises:
an operation data obtaining unit for obtaining first operation data from the first controller device and second operation data from the second controller device;
a game process unit for performing a predetermined game process based on the first operation data;
a first camera setting unit for setting a first virtual camera in a virtual game space;
a first image generation unit for generating a first game image representing the game space as viewed from the first virtual camera;
a first image output unit for outputting the first game image to a predetermined display device separate from the second controller device;
a second camera setting unit for setting, based on the second operation data, a second virtual camera which is arranged in the game space and is different from the first virtual camera;
a second image generation unit for generating a second game image representing the game space as viewed from the second virtual camera;
a second image output unit for outputting the second game image to the second controller device; and
an image information storage unit for storing image information regarding the second game image in a predetermined storage device in response to an execution of a predetermined operation on the second controller device; and
the second controller device comprises:
an image receiving unit for receiving the second game image; and
a display unit for displaying the second game image, wherein
the second game image represents a virtual photo of the game space as viewed from the second virtual camera, and the virtual photo can be reproduced for later viewing after the execution of the predetermined operation on the second controller device.

2. The game system according to claim 1, wherein the image information storage unit stores, as the image information, image data of the second game image.

3. The game system according to claim 1, wherein the image information storage unit stores, as the image information, information such that the second game image can be generated using the information and a game program used for performing the predetermined game process.

4. The game system according to claim 1, wherein the image information storage unit stores image information regarding a plurality of second game images which together form a motion video in response to an execution of the predetermined operation.

5. The game system according to claim 1, wherein:
the game device further comprises a second object control unit for controlling a second object which moves in the game space based on the second operation data; and
the second camera setting unit sets the second virtual camera based on a position of the second object.

6. The game system according to claim 5, wherein the second object control unit controls the second object, independently of whether a predetermined object whose action is controlled by the game process and the second object have collided with each other.

7. The game system according to claim 5, wherein the second object control unit controls the second object in accordance with whether a predetermined object whose action is controlled by the game process and the second object have collided with each other.

8. The game system according to claim 5, wherein
the first image generation unit generates the first game image without rendering the second object when the second object is included in a viewing field range of the first virtual camera.

9. The game system according to claim 5, wherein
the first image generation unit generates the first game image which includes an image of the second object when the second object is included in a viewing field range of the first virtual camera.

10. The game system according to claim 5, wherein
the second camera setting unit sets the second virtual camera so that the second object is included in a viewing field range of the second virtual camera when an attitude of a screen of the display unit is closer to being horizontal than a predetermined reference, and sets the second virtual camera so that a viewpoint is at the second object when the attitude of the screen of the display unit is closer to being vertical than the predetermined reference.

11. The game system according to claim 1, wherein:
the game process unit performs a game process for controlling an action of a predetermined first object based on the first operation data; and
the second image generation unit generates a second game image including an image of the first object when the first object is included in a viewing field range of the second virtual camera.

12. The game system according to claim 1, wherein:
the game device further comprises an attitude calculation unit for calculating an attitude of the second controller device; and
the second camera setting unit sets an attitude of the second virtual camera based on the attitude of the second controller device.

13. The game system according to claim 1, wherein:
the second controller device includes an input device capable of direction input, and outputs second operation data which represents the direction input; and
the second camera setting unit sets a position of the second virtual camera based on the second operation data.

14. A game system comprising a game device, a first controller device, and a second controller device, the game system comprising:
a game process unit for performing a predetermined game process based on first operation data representing an operation on the first controller device;
a first camera setting unit for setting a first virtual camera in a game space;
a first image generation unit for generating a first game image, which is a game image representing the game space as viewed from the first virtual camera and is a game image to be displayed on a predetermined display device separate from the second controller device;
a second camera setting unit for setting a second virtual camera which is arranged in the game space and is different from the first virtual camera based on the second operation data representing an operation on the second controller device;
a second image generation unit for generating a second game image which is a game image representing the game space as viewed from the second virtual camera and is the game image to be displayed on a display unit of the second controller device; and
an image information storage unit for storing, in a predetermined storage device, image information regarding the second game image in response to an execution of a predetermined operation on the second controller device, wherein
the second game image represents a virtual photo of the game space as viewed from the second virtual camera, and the virtual photo can be reproduced for later viewing after the execution of the predetermined operation on the second controller device.

15. A game process method to be carried out in a game system comprising a game device, a first controller device and a second controller device, the game process method comprising:
performing a predetermined game process based on first operation data representing an operation on the first controller device;
setting a first virtual camera in a game space;
generating a first game image which is a game image representing the game space as viewed from the first virtual camera and is a game image to be displayed on a predetermined display device separate from the second controller device;
setting a second virtual camera which is arranged in the game space and which is different from the first virtual camera based on the second operation data representing an operation on the second controller device;
generating a second game image which is a game image representing the game space as viewed from the second virtual camera and is the game image to be displayed on a display unit of the second controller device; and
storing, in a predetermined storage device, image information regarding the second game image in response to an execution of a predetermined operation on the second controller device, wherein
the second game image represents a virtual photo of the game space as viewed from the second virtual camera, and the virtual photo can be reproduced for later viewing after the execution of the predetermined operation on the second controller device.

16. The game process method according to claim 15, wherein
the predetermined storage device stores image data of the second game image as the image information.

17. The game process method according to claim 15, wherein the predetermined storage device stores, as the image information, information such that the second game image can be generated using the information and a game program used for performing the predetermined game process.

18. The game process method according to claim 15, wherein
the predetermined storage device stores image information regarding a plurality of second game images which together form a motion video in response to an execution of the predetermined operation.

19. The game process method according to claim 15, wherein:
the game system controls a second object which moves in the game space based on the second operation data; and
the second virtual camera is set based on a position of the second object.

20. The game process method according to claim 19, wherein
the second object is controlled, independently whether a predetermined object whose action is controlled by the game process and the second object have collided with each other.

21. The game process method according to claim 19, wherein the second object is controlled in accordance with whether a predetermined object whose action is controlled by the game process and the second object have collided with each other.

22. The game process method according to claim 19, wherein
the first game image is generated without rendering the second object when the second object is included in a viewing field range of the first virtual camera.

23. The game process method according to claim 19, wherein
the first game image which includes an image of the second object is generated when the second object is included in a viewing field range of the first virtual camera.

24. The game process method according to claim 19, wherein
the second virtual camera is set so that the second object is included in a viewing field range of the second virtual camera when an attitude of a screen of the display unit is closer to being horizontal than a predetermined reference, and the second virtual camera is set so that a viewpoint is at the second object when the attitude of the screen of the display unit is closer to being vertical than the predetermined reference.

25. The game process method according to claim 15, wherein:
a game process is performed for controlling an action of a predetermined first object based on the first operation data; and
a second game image including an image of the first object is generated when the first object is included in a viewing field range of the second virtual camera.

26. The game process method according to claim 15, wherein:
the game system calculates an attitude of the second controller device; and
an attitude of the second virtual camera is set based on the attitude of the second controller device.

27. The game process method according to claim 15, wherein:
the second controller device includes an input device capable of direction input, and outputs second operation data which represents the direction input; and
a position of the second virtual camera is set based on the second operation data.

28. A game device capable of communicating with a first controller device and a second controller device, the game device comprising:
an operation data obtaining unit for obtaining first operation data from the first controller device and second operation data from the second controller device;
a game process unit for performing a game process based on the first operation data;
a first camera setting unit for setting a first virtual camera in a virtual game space;
a first image generation unit for generating a first game image representing the game space as viewed from the first virtual camera;
a first image output unit for outputting the first game image to a predetermined display device separate from the second controller device;
a second camera setting unit for setting, based on the second operation data, a second virtual camera which is arranged in the game space and is different from the first virtual camera;
a second image generation unit for generating a second game image representing the game space as viewed from the second virtual camera;
a second image output unit for outputting the second game image to the second controller device; and
an image information storage unit for storing image information regarding the second game image in a predetermined storage device in response to an execution of a predetermined operation on the second controller device, wherein
the second game image represents a virtual photo of the game space as viewed from the second virtual camera, and the virtual photo can be reproduced for later viewing after the execution of the predetermined operation on the second controller device.

29. A non-transitory computer-readable storage device storing a game program to be executed by a computer of a game device capable of communicating with a first controller device and a second controller device, the game program causing the computer to execute:
performing a game process based on a first operation data representing an operation on the first controller device;
setting a first virtual camera in a game space;
generating a first game image, which is a game image representing the game space as viewed from the first virtual camera and is a game image to be displayed on a predetermined display device separate from the second controller device;
setting a second virtual camera which is arranged in the game space and is different from the first virtual camera based on the second operation data representing an operation on the second controller device;
generating a second game image which is a game image representing the game space as viewed from the second virtual camera and is the game image to be displayed on a display unit of the second controller device; and
storing, in a predetermined storage device, image information regarding the second game image in response to an execution of a predetermined operation on the second controller device, wherein
the second game image represents a virtual photo of the game space as viewed from the second virtual camera, and the virtual photo can be reproduced for later viewing after the execution of the predetermined operation on the second controller device.

* * * * *